United States Patent
Hasegawa et al.

(10) Patent No.: US 6,549,202 B1
(45) Date of Patent: Apr. 15, 2003

(54) RENDERING METHOD AND DEVICE, A GAME DEVICE, AND A COMPUTER READABLE RECORDING MEDIUM STORING PROGRAMS FOR RENDERING A THREE-DIMENSIONAL MODEL

(75) Inventors: Tsuyoshi Hasegawa, Tokyo (JP); Hitoshi Imai, Niigata (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/577,165

(22) Filed: May 24, 2000

(30) Foreign Application Priority Data

Sep. 14, 1999 (JP) .......................................... 11-260046

(51) Int. Cl.[7] .............................................. G06T 15/00
(52) U.S. Cl. ..................................................... 345/426
(58) Field of Search ................................ 345/419, 420, 345/426, 428; 382/199

(56) References Cited

U.S. PATENT DOCUMENTS

| | | | |
|---|---|---|---|
| 5,581,358 A | * 12/1996 | Seto et al. | 358/3.24 |
| 6,075,894 A | * 6/2000 | Yano et al. | 382/199 |
| 6,281,902 B1 | * 8/2001 | Nagashima | 345/419 |

FOREIGN PATENT DOCUMENTS

| | | |
|---|---|---|
| JP | 6-266852 | 9/1994 |
| JP | 8-212384 | 8/1996 |
| JP | 9-282487 | 10/1997 |

OTHER PUBLICATIONS

An article entitled "Special Feature Part 2—Analysis of Products Guide To Enjoyment of Nonphoto Tools", Nikkei Computer Graphics, May 1998, pp. 122–133.

* cited by examiner

Primary Examiner—Phu K. Nguyen
(74) Attorney, Agent, or Firm—Greenblum & Bernstein, P.L.C.

(57) ABSTRACT

Method and apparatus for implementing cell-animation-looking colors as an example of non-photo-realistic rendering in three-dimensional model plot processing. Perspective transformations and light source calculations are carried out for a polygon of the three-dimensional model. Then, the luminosity of each apex of the polygon is calculated. In addition, the color for plotting the polygon is calculated for each of the luminosity ranges defined in advance. Alternatively, the colors for plotting may be calculated and stored in advance. Then, one of the luminosity range is selected from the luminosity ranges defined in advance. If the luminosity range of each pixel inside the polygon lies within the luminosity range selected, the pixel is plotted in the color for plotting corresponding to the luminosity range selected. By repeatedly performing these operations, a cell-animation-looking image is generated.

18 Claims, 12 Drawing Sheets

| THRESHOLD VALUE | REFERENCE LUMINOSITY |
|---|---|
| 0.75 | 0.75 |
| 0.50 | 0.50 |
| 0.00 | 0.25 |

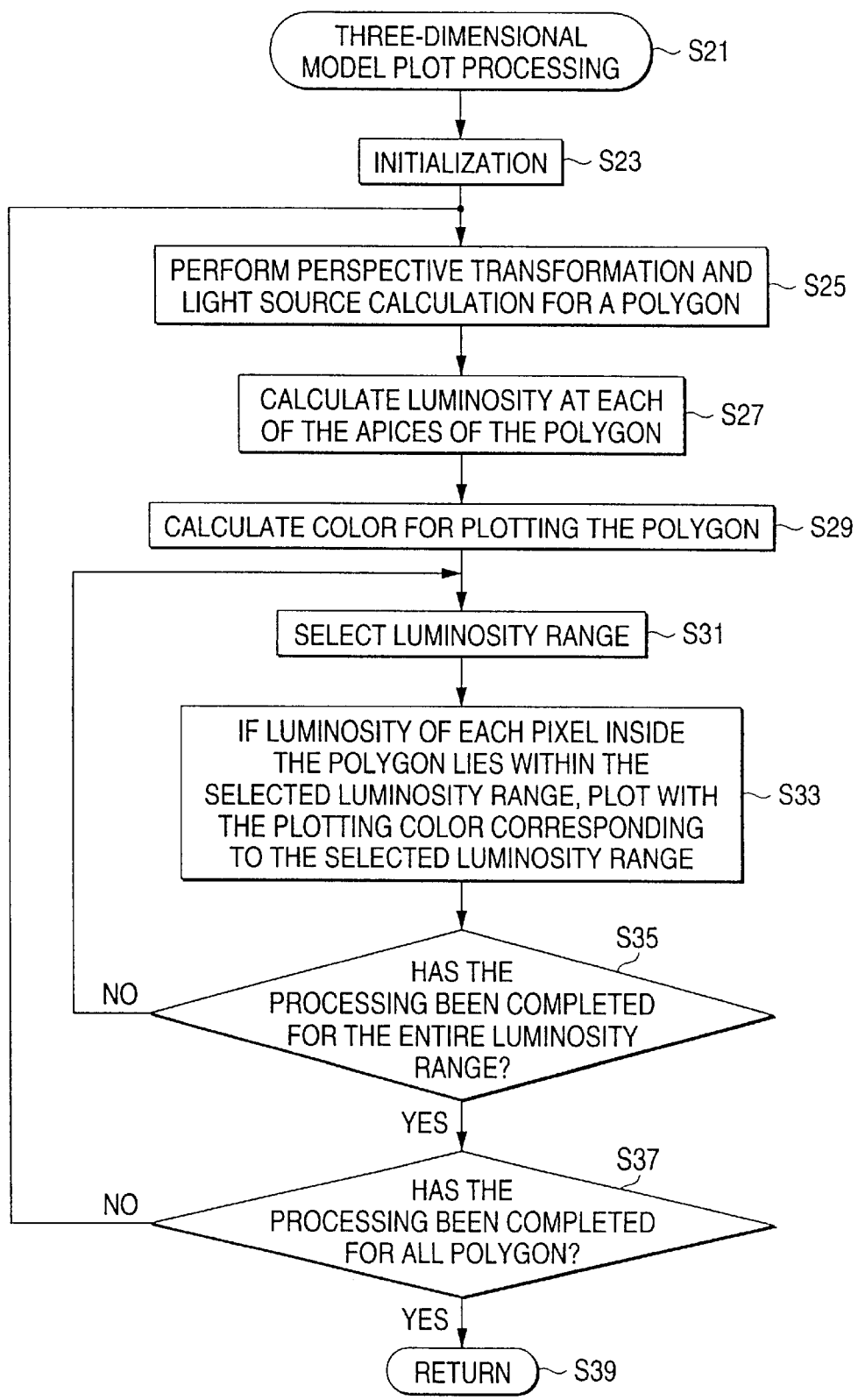

FIG. 7A

| TRIANGULAR POLYGON 0 BEFORE PERSPECTIVE TRANSFORMATION |
|---|
| TRIANGULAR POLYGON 1 BEFORE PERSPECTIVE TRANSFORMATION |
| TRIANGULAR POLYGON 2 BEFORE PERSPECTIVE TRANSFORMATION |
| ⋮ |
| TRIANGULAR POLYGON N-1 BEFORE PERSPECTIVE TRANSFORMATION |

FIG. 7B

TRIANGULAR POLYGON BEFORE PERSPECTIVE TRANSFORMATION

|  | COLOR OF MATERIAL (Y, I, Q) |
|---|---|
| APEX 0 | APEX DATA IDX |
| APEX 1 | APEX DATA IDX |
| APEX 2 | APEX DATA IDX |

FIG. 7C

APEX DATA TABLE

| | |
|---|---|
| APEX DATA IDX 0 | THREE-DIMENSIONAL COORDINATES (P0x, P0y, P0z) |
| | NORMAL VECTOR (N0x, N0y, N0z) |
| APEX DATA IDX 1 | THREE-DIMENSIONAL COORDINATES (P1x, P1y, P1z) |
| | NORMAL VECTOR (N1x, N1y, N1z) |
| | ⋮ |
| APEX DATA IDX [N-1] | THREE-DIMENSIONAL COORDINATES (P[N-1]x, P[N-1]y, P[N-1]z) |
| | NORMAL VECTOR (N[N-1]x, N[N-1]y, N[N-1]z) |

TRIANGULAR POLYGON AFTER
PERSPECTIVE TRANSFORMATION

APEX 0
- SCREEN COORDINATES (x, y, z)
- COLOR DATA (r, g, b)
- α VALUE

APEX 1
- SCREEN COORDINATES (x, y, z)
- COLOR DATA (r, g, b)
- α VALUE

APEX 2
- SCREEN COORDINATES (x, y, z)
- COLOR DATA (r, g, b)
- α VALUE

| LUMINOSITY RANGE ||  REFERENCE LUMINOSITY |
| UPPER LIMIT | LOWER LIMIT |  |
|---|---|---|
| 1.00 | 0.75 | 0.75 |
| 0.74 | 0.50 | 0.50 |
| 0.49 | 0.00 | 0.25 |

| THRESHOLD VALUE | REFERENCE LUMINOSITY |
|---|---|
| 0.3125 | 0.75 |
| 0 | 0.60 |

RENDERING METHOD AND DEVICE, A
GAME DEVICE, AND A COMPUTER
READABLE RECORDING MEDIUM
STORING PROGRAMS FOR RENDERING A
THREE-DIMENSIONAL MODEL

BACKGROUND OF THE INVENTION

1. Field of the Invention

The present invention relates to a method and device for rendering a three-dimensional model in a virtual space, and to a computer readable recording medium on which a rendering program is stored.

2. Description of the Related Art

In recent years, the technology of computer graphics (CG) has rapidly evolved. Most CG techniques under study aim to make a more photo-realistic rendering. These techniques have made it possible to express images in a more photo-realistic manner.

However, while these photo-realistic rendering techniques have been in use, non-photo-realistic rendering, that is, a technique for creating handwriting-looking images by CG is desired.

For example, cell animation requires enormous time to prepare images of characters in various states by means of human hands. However, CG could greatly reduce the time for preparing these images.

Accordingly, an object of the present invention is to provide a rendering method and device for realizing cell-animation-looking colors as an example of non-photo-realistic rendering, and a computer readable recording medium on which a rendering program is stored.

SUMMARY OF THE INVENTION

According to a first aspect of the present invention, a rendering method for rendering a three-dimensional model disposed in a virtual space and constituted by a plurality of polygons, comprises:

a first step for calculating, for each of the polygons, a first luminosity distribution of a region where the polygons are plotted in accordance with a luminosity predetermined for each of apexes of the polygons, and a second step for generating a color distribution in accordance with a second luminosity distribution and colors predetermined for the polygons, the second luminosity distribution where luminosity is divided into levels within a certain range, a representative luminosity being assigned to each of the levels, the first luminosity distribution calculated in the first step being replaced by the representative luminosity assigned to each of levels of luminosity, and for plotting the polygons in the color distribution.

This allows, for example, a color distribution to be generated based on the second luminosity distribution with the number of levels less than that of the first luminosity distribution that is calculated by a technique such as the Gouraud shading, thereby realizing a cell-animation-looking solid shading.

A rendering method according to a second aspect of the present invention comprises:

a first step for selecting, with luminosity being divided into levels within a certain range, luminosity levels one by one from a plurality of luminosity levels (for example, a luminosity range in an embodiment), each level being associated in advance with a reference luminosity, and a second step for calculating, each time the luminosity level is selected in the first step, luminosity at a position of each pixel inside the polygons in accordance with a luminosity predetermined for each of apexes of the polygons, and for plotting, only when a luminosity at the position of each pixel lies within a range of luminosity corresponding to the selected luminosity level, the pixel with a color in accordance with the reference luminosity corresponding to the selected luminosity level and a color predetermined for the polygons.

Carrying out the first and second step once would cause only part of the polygons to be colored with a color in accordance with the reference luminosity. However, repeating the first and second step for the number of luminosity levels would cause the inside of the polygons to be colored with a color in accordance with the reference luminosity corresponding to each of the plurality of luminosity levels defined in advance. That is, a cell-animation-looking solid shading can be thereby realized.

The second aspect of the present invention can further comprise a third step for calculating, each time the luminosity level is selected in the aforementioned first step, a color in accordance with a reference luminosity corresponding to the selected luminosity level and a color predetermined for the polygons. Furthermore, the aforementioned second step can be a step for calculating a luminosity at a position of each pixel inside the polygons in accordance with a luminosity predetermined for each of apexes of the polygons, and for plotting, only when a luminosity at the position of each pixel lies within a range of luminosity corresponding to the selected luminosity level, the pixel with a color calculated in the aforementioned step 3.

The second aspect of the present invention can further comprise a fourth step for calculating, before the aforementioned first step, a color for each luminosity level in the polygons in accordance with each reference luminosity associated in advance with each of the luminosity levels and a color predetermined for the polygons, and for associating the color to each luminosity level. Furthermore, the aforementioned second step can be a step for plotting the pixel by employing the color associated with the luminosity level selected in the first step as a color in accordance with the reference luminosity corresponding to the selected luminosity level and the color predetermined for the polygons.

In addition, the second aspect of the present invention can further comprise a fifth step for deriving and setting, before the aforementioned first step, a luminosity at each of apexes of the polygons by a light source calculation for the three-dimensional model. This fifth step can be a step for deriving and setting a luminosity at each of apexes of the polygons in accordance with a normal vector of each apex and information regarding light sources. Alternatively, the fifth step can be a step for deriving the luminosity at each of a plurality of apexes of the polygons from the light source calculation to be carried out for a three-dimensional model in consideration of the color predetermined for the polygons.

Furthermore, the aforementioned first step can be a step for selecting luminosity levels one by one from two or three luminosity levels defined in advance. This is because, in the actual cell animation, two or three colors are used for divided shading.

A rendering device according to a third aspect of the present invention for rendering a three-dimensional model disposed in a virtual space and constituted by a plurality of polygons, comprises:

calculating means, for each of the polygons, for calculating a first luminosity distribution of a region where the polygons are plotted in accordance with a luminosity predetermined for each of a plurality of apexes of the polygons, and plotting means for generating a color distribution in accordance with a second luminosity distribution and colors predetermined for the polygons, the second luminosity distribution where luminosity is divided into levels within a certain range, a representative luminosity is assigned to each of the levels, and the first luminosity distribution calculated by the calculating means is replaced by the representative luminosity assigned to each of levels of luminosity, and for plotting the polygons in the color distribution.

A rendering device according to a fourth aspect of the present invention comprises:

selecting means for selecting, with luminosity being divided into levels within a certain range, luminosity levels one by one from a plurality of luminosity levels, each level being associated in advance with a reference luminosity, and plotting means for calculating, each time the luminosity level is selected, luminosity at a position of each pixel inside the polygons in accordance with a luminosity predetermined for each of a plurality of apexes of the polygons, and for plotting, only when a luminosity at the position of each pixel lies within a range of luminosity corresponding to the selected luminosity level, the pixel with a color in accordance with the reference luminosity corresponding to the selected luminosity level and a color predetermined for the polygons.

By carrying out each of the steps in the rendering methods according to the first and second aspect of the present invention by a computer, the same effect as is provided by the aforementioned rendering methods can be obtained. Therefore, the processing steps described above can be carried out using hardware such as a computer, thereby facilitating the implementation of the rendering technique according to the present invention using the hardware.

A program according to a fifth aspect of the present invention for rendering a three-dimensional model disposed in a virtual space and constituted by a plurality of polygons is to allow a computer to carry out:

a first step for calculating, for each of the polygons, a first luminosity distribution of a region where the polygons are plotted in accordance with a luminosity predetermined for each of a plurality of apexes of the polygons, and a second step for generating a color distribution in accordance with a second luminosity distribution and colors predetermined for the polygons, the second luminosity distribution where luminosity is divided into levels within a certain range, a representative luminosity is assigned to each of the levels, and the first luminosity distribution calculated in the first step is replaced by the representative luminosity assigned to each of levels of luminosity, and for plotting the polygons in the color distribution.

Furthermore, a program according to a sixth aspect of the present invention for rendering is to allow a computer to carry out:

a first step for selecting, with luminosity being divided into levels within a certain range, luminosity levels one by one from a plurality of luminosity levels, each level being associated in advance with a reference luminosity, and a second step for calculating, each time the luminosity level is selected in the first step, luminosity at a position of each pixel inside the polygons in accordance with a luminosity predetermined for each of a plurality of apexes of the polygons, and for plotting, only when: a luminosity at the position of each pixel lies within a range of luminosity corresponding to the selected luminosity level, the pixel with a color in accordance with the reference luminosity corresponding to the selected luminosity level and a color predetermined for the polygons.

The program according to the fifth and sixth aspect of the present invention is stored on a recording medium or in a storing unit, such as, for example, a CD-ROM, a floppy disc, a memory cartridge, a memory, or a hard disc. As such, by allowing a computer to read a program stored on a recording medium or a storing unit, the aforementioned rendering device and a game device, which is to be described below, can be implemented. Moreover, by using a recording medium, the program can be readily distributed or sold as a software product independently of the device. Furthermore, by carrying out the program using hardware such as a computer, the graphics technique according to the present invention can be readily implemented.

In addition, modifications or the like, which have been described with respect to the second aspect of the present invention, can be applied to the program according to the sixth aspect of the present invention.

A game device according to a seventh aspect of the present invention for rendering a three-dimensional model disposed in a virtual space and constituted by a plurality of polygons comprises a computer, and read means for reading, from a computer readable recording medium on which a program to be carried out by the computer, the program. In addition, the program allows the computer to carry out:

a calculating function for calculating, for each of the polygons, a first luminosity distribution of a region where the polygons are plotted in accordance with a luminosity predetermined for each of a plurality of apexes of the polygons, and a plotting function for generating a color distribution in accordance with a second luminosity distribution and colors predetermined for the polygons, the second luminosity distribution where luminosity is divided into levels within a certain range, a representative luminosity is assigned to each of the levels, and the first luminosity distribution calculated by the calculating function is replaced by the representative luminosity assigned to each of levels of luminosity, and for plotting the polygons in the color distribution.

A game device according to a eighth aspect of the present invention comprises a computer, and reading means for reading, from a computer readable recording medium on which a program to be carried out by the computer, the program. In addition, the program allows the computer to carry out:

a selecting function for selecting, with luminosity being divided into levels within a certain range, luminosity levels one by one from a plurality of luminosity levels, each level being associated in advance with a reference luminosity, and a plotting function for calculating, each time a luminosity level is selected by the selecting function, luminosity at a position of each pixel inside the polygons in accordance with a luminosity predetermined for each of a plurality of apexes of the polygons, and for plotting, only when a luminosity at the position of each pixel lies within a range of luminosity corresponding to the selected luminosity level, the pixel with a color in accordance with the reference luminosity corresponding to the selected luminosity level and a color predetermined for the polygons.

A game device according to a ninth aspect of the present invention comprises:

a computer, read means for reading, from a computer readable recording medium on which a program to be carried out by the computer, the program, calculating means for calculating, for each of the polygons and in accordance with the program read out, a first luminosity distribution of a region where the polygons are plotted in accordance with a luminosity predetermined for each of apexes of the polygons, and plotting means for generating a color distribution in accordance with a second luminosity distribution and colors predetermined for the polygons, the second luminosity distribution where luminosity is divided into levels within a certain range, a representative luminosity is assigned to each of the levels, and the first luminosity distribution calculated by the calculating means is replaced by the representative luminosity assigned to each of levels of luminosity, and for plotting the polygons in the color distribution.

A game device according to a tenth aspect of the present invention comprises:

a computer, read means for reading, from a computer readable recording medium on which a program to be carried out by the computer, the program, selecting means for selecting, with luminosity being divided into levels within a certain range and in accordance with the program read out, luminosity levels one by one from a plurality of luminosity levels, each level being associated in advance with a reference luminosity, and plotting means for calculating, each time a luminosity level is selected by the selecting function and in accordance with the program read out, luminosity at a position of each pixel inside the polygons in accordance with a luminosity predetermined for each of a plurality of apexes of the polygons, and for plotting, only when a luminosity at the position of each pixel lies within a range of luminosity corresponding to the selected luminosity level, the pixel with a color in accordance with the reference luminosity corresponding to the selected luminosity level and a color predetermined for the polygons.

BRIEF DESCRIPTION OF THE DRAWINGS

FIG. 6 is a flow diagram showing the plotting processing of a three-dimensional model of the Example 1;

FIGS. 7A, 7B and 7C are schematic views showing the data structure of a polygon model, in which FIG. 7A shows the entire data structure of a three-dimensional model, FIG. 7B shows the data structure of a triangular polygon before being converted into a perspective view, and FIG. 7C shows the data structure of an apex data table;

DESCRIPTION OF THE PREFERRED EMBODIMENTS

Figure 1:
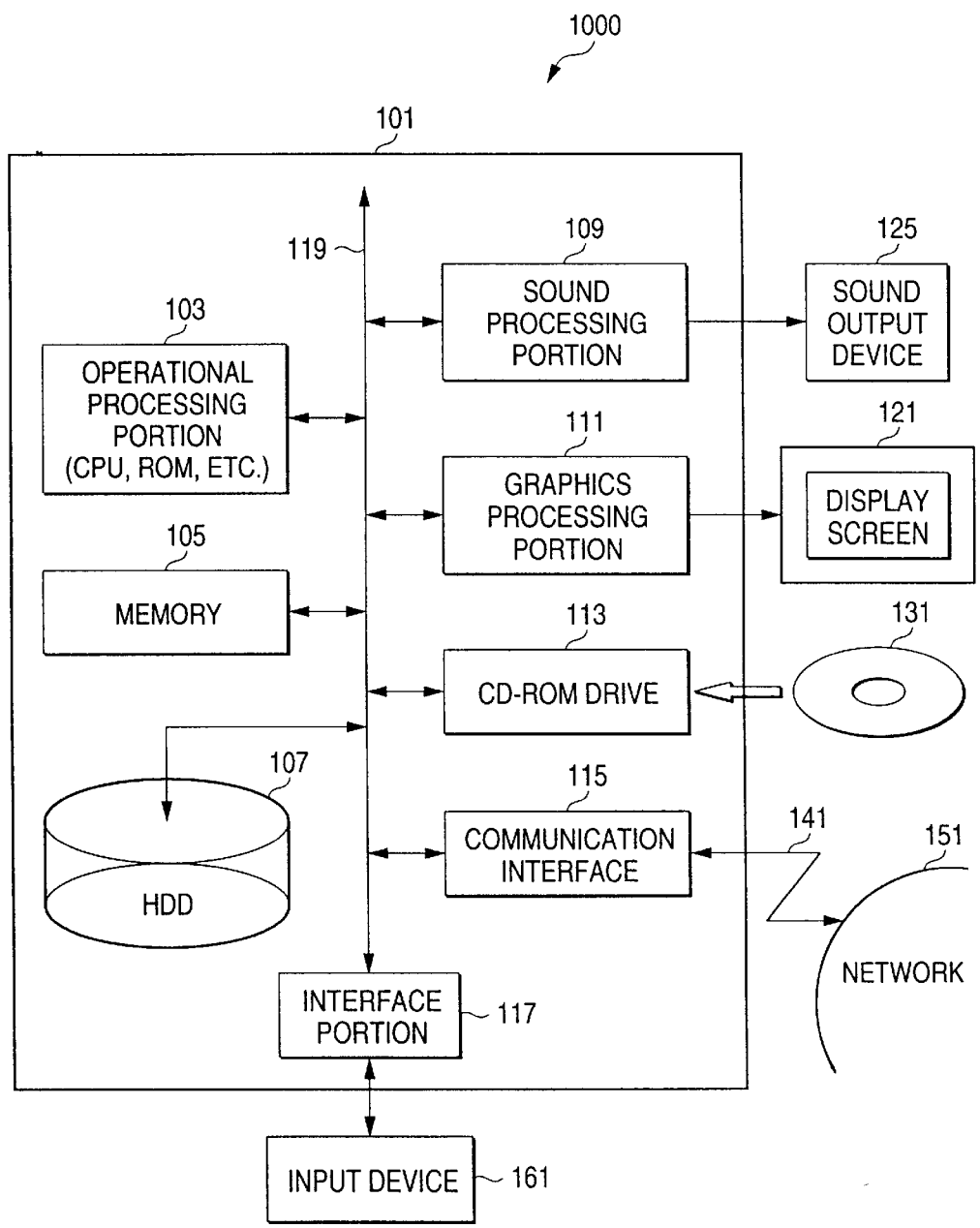
FIG. 1 is a block diagram showing an example of a computer for carrying out a program according to the present invention.

First, an example of a computer 1000 for carrying out a computer program is shown in FIG. 1, with the computer program implementing each of the embodiments being described later. The computer 1000 comprises a computer body 101. The computer body 101 includes, for example, an operational processing portion 103 connected to an internal bus 119 thereof, a memory 105, a hard disc drive HDD 107, a sound processing portion 109, a graphics processing portion 111, a CD-ROM drive 113, a communication interface 115, and an interface portion 117.

The sound processing portion 109 of the computer body 101 is connected to a sound output device 125 which is a speaker, while the graphics processing portion 111 is connected to a display device 121 having a display screen. In addition, a CD-ROM 131 can be mounted to the CD-ROM drive 113. The communication interface 115 is connected via a network 151 and a communication medium 141. The interface portion 117 is connected with an input device 161.

The operational processing portion 103 includes a CPU, ROM, and the like, carrying out a program stored on the HDD 107 and the CD-ROM 131, and controlling the computer 1000. The memory 105 provides a working area for the operational processing portion 103. The HDD 107 provides a storage region for storing programs and data. When a program executed by the operational processing portion 103 issues a command to output sound, the sound processing portion 109 interprets the command and outputs a sound signal to the sound output device 125.

The graphics processing portion 111 outputs a signal for carrying out display on the display screen of the display device 121 in accordance with a plot command to be outputted from the operational processing portion 103. The CD-ROM drive 113 reads programs and data on the CD-ROM 131. The communication interface 115 is connected to the network 151 via the communication medium 141 to carry out communication with other computers or the like. The interface portion 117 outputs input from the input device 161 to the memory 105, while the operational processing portion 103 interprets it to perform arithmetic processing.

A program and data related to each of the embodiments, which are to be described later, are stored in the beginning, for example, in the CD-ROM 131. At the time of execution, the program and data are read out from the CD-ROM drive 113 to be loaded to the memory 105. The operational processing portion 103 processes the program and data related to the present invention, which are loaded to the memory 105, and then outputs a plot command to the graphics processing portion 111. Furthermore, intermittent data is stored in the memory 105. The graphics processing portion 111 performs processing in accordance with the plot command from the operational processing portion 103 and outputs a signal for carrying out a display on the display screen of the display device 121.

Figure 2:
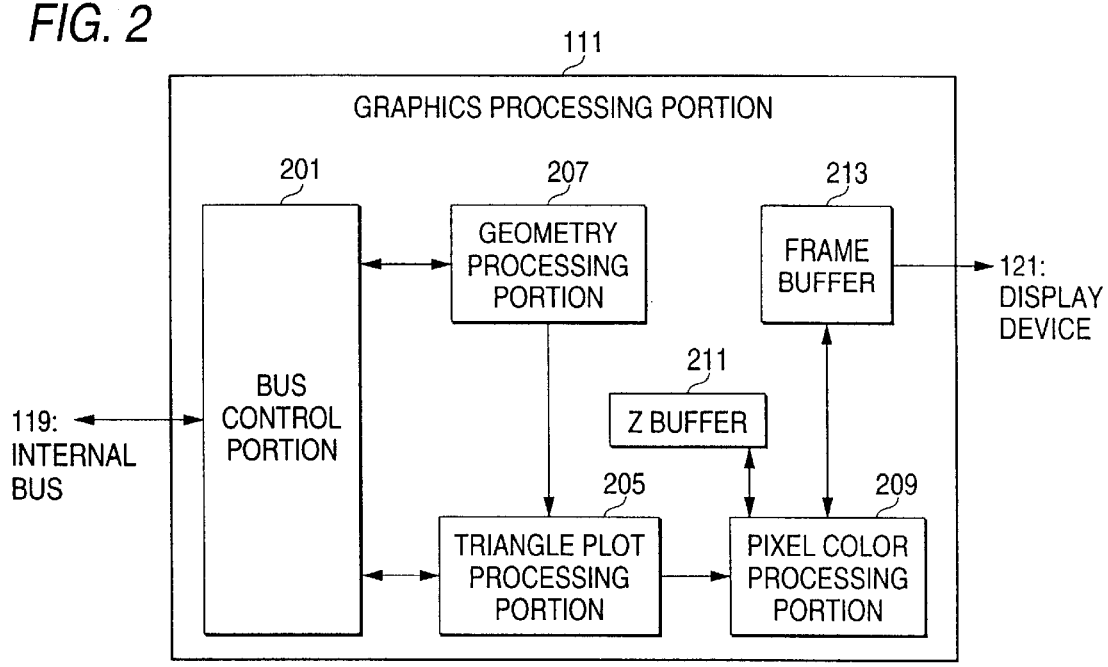
FIG. 2 is a block diagram showing an example of the graphics processing portion in FIG. 1.

Next, an example of the graphics processing portion 111 shown in FIG. 1 is explained in detail with reference to FIG. 2. The graphics processing portion 111 includes, for example, a bus control portion 201 for communicating with the internal bus 119, and a geometry processing portion 207 and a triangle plot processing portion 205 for communicating data with the bus control portion 201. The graphics processing portion 111 also includes a pixel color processing portion 209 for receiving and processing data from the triangle plot processing portion 205, and a Z buffer 211 which stores Z values of each pixel and is used by the pixel color processing portion 209. The graphics processing portion 111 further includes a frame buffer 213 for storing display screen data from the pixel color processing portion 209. Furthermore, the display signal from the frame buffer 213 is outputted to the display device 121.

The bus control portion 201 of the graphics processing portion 111 receives a plot command outputted from the operational processing portion 103 via the internal bus 119 and outputs the command to either the geometry processing portion 207 inside the graphics processing portion 111 or the triangle plot processing portion 205. In some case, the bus control portion 201 also performs processing for outputting outputs of the geometry processing portion 207 or the triangle plot processing portion 205 to the memory 105 via the internal bus 119. The geometry processing portion 207 performs geometrical processing such as coordinate transformation, light source calculation, rotation, contraction, magnification, and the like. The geometry processing portion 207 outputs results of geometrical operation and to the triangle plot processing portion 205.

The triangle plot processing portion 205 interpolates the data of each apex of a triangular polygon to generate the data at each point inside the triangular polygon. The pixel color processing portion 209 uses the data at each point inside the triangular polygon, which the triangle plot processing portion 205 generates, to write a display image to the frame buffer 213. At this time, the pixel color processing portion 209 uses the Z buffer 211 to perform the hidden surface removal. In particular, in the present invention, the triangle plot processing portion 205 generates $\alpha$ values that represent transparency for each point inside the triangular polygon. Accordingly, only when the $\alpha$ value lies within a certain range, the pixel color processing portion 209 performs processing for storing the color at the point at a predetermined position of the frame buffer 213.

For example, in the case where the operational processing portion 103 outputs, to the graphics processing portion 111, a plot command for perspective transformation and light source calculation with information regarding the position in the world coordinate system and color of each apex of the triangular polygon employed as data, the following processing is carried out in the graphics processing portion 111.

The bus control portion 201, which has received the plot command, outputs the command to the geometry processing portion 207. The geometry processing portion 207 carries out the perspective transformation and the light source calculation in order to calculate the coordinate values (including Z values) and color of each apex of the triangular polygon in the screen coordinate system. The geometry processing portion 207 outputs the calculated results to the triangle plot processing portion 205. Using the coordinate values (including Z values) and color of each apex of the triangular polygon, the triangle plot processing portion 205 calculates the coordinate values (including Z values) and color of each pixel inside the triangular polygon. Furthermore, the triangle plot processing portion 205 outputs the coordinate values (including Z values) and color of each pixel to the pixel color processing portion 209.

The pixel color processing portion 209 reads the current Z value of the pixel from the Z buffer 211 to compare it with the Z value outputted from the triangle plot processing portion 205. If the Z value outputted is smaller than the current Z value, the pixel color processing portion 209 stores the outputted Z value to the storage position corresponding to the pixel in the Z buffer 211. The pixel color processing portion 209 also stores the color of the pixel to the storage position corresponding to the coordinate values of the pixel in the frame buffer 213.

Each of the embodiments shown below is carried out by means of the computer shown in FIG. 1.

1. EXAMPLE 1

Figure 3:
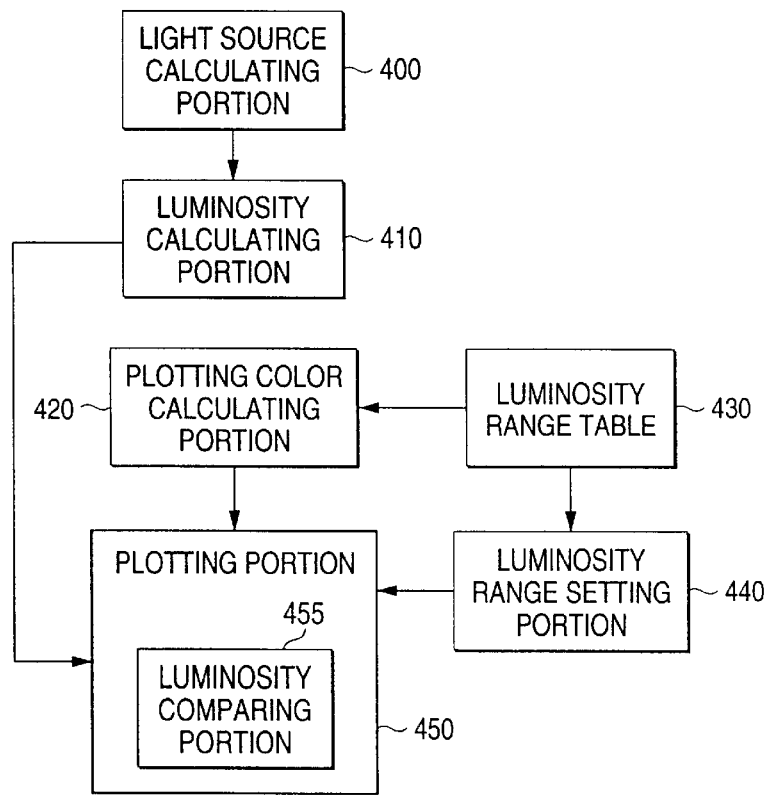
FIG. 3 is a functional block diagram showing of Example 1.

Next, Example 1 of the present invention is generally explained with reference to the functional block diagram of FIG. 3. Example 1 includes a light source calculating portion 400, a luminosity calculating portion 410, a plotting color calculating portion 420, a luminosity range table 430, a luminosity range setting portion 440, a plotting portion 450, and a luminosity comparing portion 455.

The light source calculating portion 400 carries out the perspective transformation, for example, of each apex of a polygon in a three-dimensional model disposed in a virtual three-dimensional space onto a screen. Then, the light source calculating portion 400 carries out the light source calculation about each apex of the polygon that has been subjected to the perspective transformation. The light source calculation is carried out to calculate the shade (luminosity) produced by a virtual beam of light emitted from a light source. Subsequently, the luminosity calculating portion 410 calculates luminosity based on the color of each apex of the polygon, which has been calculated by the light source calculating portion 400. Normally, the light source calculating portion 400 calculates colors in the RBG system, and thus, the luminosity calculating portion 410 determines luminosity Y by YIQ conversion of RBG. The luminosity of each apex of the polygon is outputted to the plotting portion 450.

Figures 4, 5:
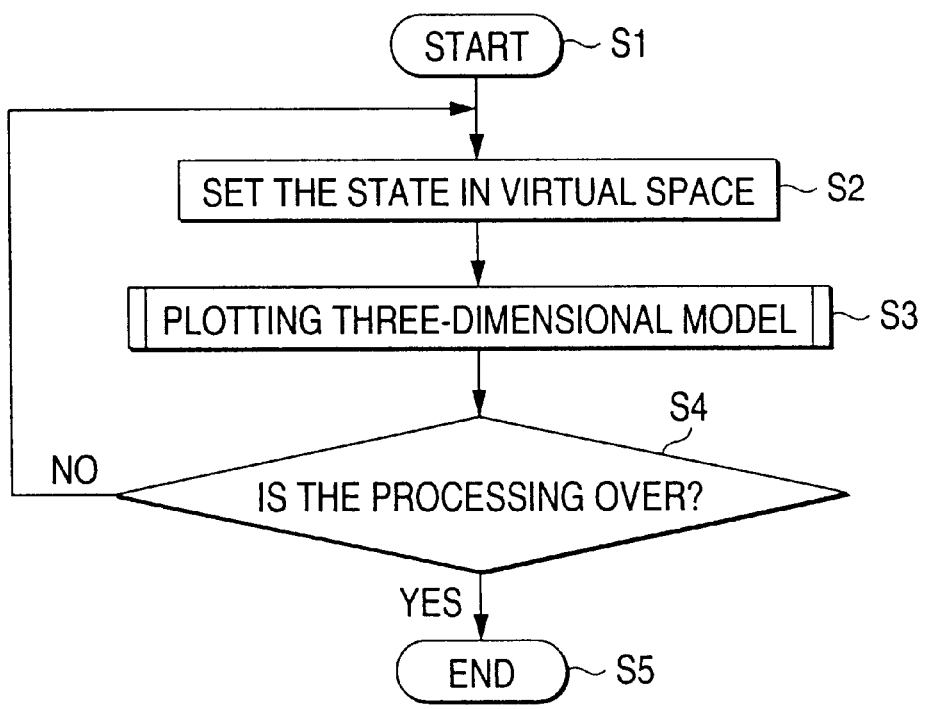
FIG. 4 is a table showing an example of luminosity range tables.
FIG. 5 is a flow diagram showing overall processing of the present invention.

On the other hand, in Example 1, the luminosity range table 430 is available. This luminosity range table 430 is, for example, a table as shown in FIG. 4. That is, the table has a pair of threshold value and reference luminosity. In the table, three levels are set, such as a reference luminosity of 0.75 for a threshold value of 0.75, a reference luminosity of 0.50 for a threshold value of 0.50, and a reference luminosity of 0.25 for a threshold value of 0.00. It is understood that the luminosity takes on values from 0 to 1. Instead of the threshold value, a range with an upper limit and a lower limit may be designated (for example, refer to FIG. 9). Referring to the luminosity range table 430, the plotting color calculating portion 420 calculates colors for plotting corresponding to each threshold value. A color for plotting corresponding to each threshold value is calculated using the reference luminosity corresponding to the threshold value and information regarding the color predetermined for each polygon. The plotting color calculating portion 420 outputs the calculated color for plotting to the plotting portion 450.

The luminosity range setting portion 440 selects one threshold value of the luminosity range table 430 to set the value to the plotting portion 450. In the case where the luminosity range table 430 shown in FIG. 4 is used as it is, the luminosity range setting portion 440 sets the values from top to bottom one by one in sequence. In the case where a range with upper and lower limits is designated, the selection and setting can be carried out at random.

The plotting portion 450 interpolates the luminosity of each apex of the polygon outputted from the luminosity calculating portion 410 to calculate the luminosity of each pixel inside the polygon (a luminosity distribution in the polygon). This calculation is carried out, for example, in the triangle plot processing portion 205 of FIG. 2. The method of the interpolation may be the algorithm of either a Gouraud shading or a Phong shading.

Then, when the luminosity comparing portion 455 compares the luminosity of each pixel with the threshold value set by the luminosity range setting portion 440 to find that the luminosity of the pixel is equal to or greater than the threshold value, the pixel is plotted with the color for plotting in accordance with the reference luminosity corresponding to this threshold value. If the luminosity of the pixel is less than the threshold value, the pixel is not plotted at this stage. The plotting processing including the comparing processing is carried out, for example, in the pixel color processing portion 209 of FIG. 2. When the luminosity range setting portion 440 has finished setting all threshold values of the luminosity range table 430 and the plotting portion 450 has correspondingly carried out processing for all pixels in the polygon, the inside of the polygon is shaded in three stages in the example of FIG. 4.

Furthermore, in the aforementioned processing, it cannot be readily understood since the colors for plotting are calculated in advance that the foregoing processing is substantially the same as the processing in which the luminosity of each pixel (a luminosity distribution in the polygon) is substituted for a reference luminosity corresponding to a luminosity range to which the luminosity belongs (a second luminosity distribution is generated in the polygon), and plotting is carried out with the color predetermined for the polygon and the colors for plotting (a color distribution in the polygon) generated from the reference luminosity.

Furthermore, in the case where the luminosity range table 430 shown in FIG. 4 is used as it is, required is the hidden surface removal by means of the Z buffer. For example, as shown in FIG. 4, this is to set an upper limit to the luminosity range so as not to allow colors for plotting to be overlapped since a luminosity equal to or greater than 0.75 is also greater than 0.5 and greater than 0.0. If the luminosity of a pixel is not less than 0.75, this pixel is plotted with a color for plotting corresponding to the threshold value of 0.75 and the Z value of the pixel is stored in the Z buffer.

If the threshold value reached 0.5, the Z value of the pixel is read from the Z buffer and is compared with a Z value of the same pixel to be written into. However, since they have the same value, the color for plotting corresponding to the threshold value of 0.5 for the pixel is not written to the frame buffer. The same holds true for the threshold value of 0.0.

Furthermore, the luminosity of an apex of the polygon and a pixel inside the polygon is usually handled as an attribute value of color (RGB) or $\alpha$ which is used as transparency. The $\alpha$ value is normally defined within the range of 0 to 255 and thus values 255 times luminosity are used for the attribute value $\alpha$. Therefore, the threshold values (upper and lower limits) of the luminosity range table 430 may lie within the range of 0 to 255.

Next, the processing flow of Example 1 is explained.

Entire Processing Flow

FIG. 5 shows the entire processing flow of Example 1. When the processing has started, first, the state of a virtual space is set (step S2). This is processing for changing the state of the virtual space accordingly when changing the position of viewpoint, changing the position of light source, moving a three-dimensional model, or deforming the three-dimensional model. Subsequently, the three-dimensional model plot processing is performed in Example 1 (step S3). This processing will be explained in more detail with reference to FIG. 6. Then, the steps S2 and S3 are repeated until the processing is completed (step S4).

Three-dimensional Model Plot Processing

Now, with reference to FIG. 6, the flow of the three-dimensional model plot processing of Example 1 is explained. First, initialization is carried out (step S23). In this initialization, a luminosity range table (for example, FIG. 4 or 9) corresponding to a three-dimensional model is obtained. Next, perspective transformation and light source calculation are carried out for a polygon of the three-dimensional model (step S25). The perspective transformation is to transform coordinate values of each apex of the polygon in the world coordinate system to those in the screen coordinate system. The light source calculation is to calculate the shade (luminosity) produced by a virtual beam of light emitted from the light source.

Equation 1

$$\begin{pmatrix} Pn0 \\ Pn1 \\ Pn2 \end{pmatrix} = \begin{pmatrix} \text{Light Matrix} \end{pmatrix} \begin{pmatrix} Nnx \\ Nny \\ Nnz \end{pmatrix} \quad (1)$$

$$\begin{pmatrix} Pnr \\ Png \\ Pnb \end{pmatrix} = \begin{pmatrix} \text{L Color Matrix} \end{pmatrix} \begin{pmatrix} Pn0 \\ Pn1 \\ Pn2 \end{pmatrix}$$

$$\begin{pmatrix} Cnr \\ Cng \\ Cnb \end{pmatrix} = \begin{pmatrix} Pnr & 0 & 0 \\ 0 & Png & 0 \\ 0 & 0 & Pnb \end{pmatrix} \begin{pmatrix} Mr \\ Mg \\ Mb \end{pmatrix}$$

Furthermore, two methods are available for the light source calculation in the Example: (A) a method for considering the color of the material defined for the polygon (e.g., Equation 1); and (B) a method for considering no color of the material. For (A), the following equations are used for calculation.

Furthermore, n in Pn0, Pn1, Pn2, Nnx, Nny, Nnz, Pnr, Png, Pnb, Cnr, Cng, and Cnb shows the nth apex. Nnx is the x component of the normal at the nth apex, Nny is the y component of the normal at the nth apex, and Nnz is the z component of the normal at the nth apex. The light matrix is formed by normalized light source vectors and is shown below the case for defining up to three parallel light sources. Moreover, the L color matrix has the color of the beam of light emitted from the light source as a component and is shown below for the case of defining up to three light sources. M denotes the color of the material of the polygon, and Mr, Mg, and Mb denote R, G, and B of the material, respectively. The outputs of (A) are Cnr, Cng, and Cnb. Cnr, Cng, and Cnb are R, G, and B components of the color determined by the light source calculation for the nth apex.

Equation 2

$$\text{Light Matrix} = \begin{pmatrix} L_{0x} & L_{0y} & L_{0z} \\ L_{1x} & L_{1y} & L_{1z} \\ L_{2x} & L_{2y} & L_{2z} \end{pmatrix} \quad (2)$$

$$\text{L color Matrix} = \begin{pmatrix} LC_{0r} & LC_{1r} & LC_{2r} \\ LC_{0g} & LC_{1g} & LC_{2g} \\ LC_{0b} & LC_{1b} & LC_{2b} \end{pmatrix} \quad (3)$$

Furthermore, $L_{0x}$, $L_{0y}$, and $L_{0z}$ are components of the normalized light source vector 0. $L_{1x}$, $L_{1y}$, and $L_{1z}$ are components of the normalized light source vector 1. $L_{2x}$, $L_{2y}$, and $L_{2z}$ are components of the normalized light source vector 2. In addition, the color of a beam of light of the light source vector 0 has the components of $LC_{0r}$, $LC_{0g}$, and $LC_{0b}$. The color of a beam of light of the light source vector 1 has the components of $LC_{1r}$, $LC_{1g}$, and $LC_{1b}$. The color of a beam of light of the light source vector 2 has the components of $LC_{2r}$, $LC_{2g}$, and $LC_{2b}$. Furthermore, each of the components of the color takes on values from 0.0 to 1.0. For example, in the case where only 0 is present and white light is used at an angle of 45_<with respect to the X, Y, and Z axes, the following matrix is given.

Equation 3

$$\text{Light Matrix} = \begin{pmatrix} 0.5773 & 0.5773 & 0.5773 \\ 0.0000 & 0.0000 & 0.0000 \\ 0.0000 & 0.0000 & 0.0000 \end{pmatrix} \quad (4)$$

$$\text{L color Matrix} = \begin{pmatrix} 1.0000 & 0.0000 & 0.0000 \\ 1.0000 & 0.0000 & 0.0000 \\ 1.0000 & 0.0000 & 0.0000 \end{pmatrix} \quad (5)$$

In addition, the following equations are used for (B).

Equation 4

$$\begin{pmatrix} Pn0 \\ Pn1 \\ Pn2 \end{pmatrix} = \begin{pmatrix} \text{Light Matrix} \end{pmatrix} \begin{pmatrix} Nnx \\ Nny \\ Nnz \end{pmatrix} \quad (6)$$

$$\begin{pmatrix} Pnr \\ Png \\ Pnb \end{pmatrix} = \begin{pmatrix} \text{L Color Matrix} \end{pmatrix} \begin{pmatrix} Pn0 \\ Pn1 \\ Pn2 \end{pmatrix}$$

The results of the two equations are naturally different from each other. The result of (A), above, is correct. However, (B), above, handles fewer calculations compared with (A), and therefore can perform the processing at a higher rate. Furthermore, the quality of the images is not different from each other.

Next, the luminosity of each apex of the polygon is calculated (step S27). Calculation of the luminosity employs the YIQ transformation. When colors of apexes have been determined by the aforementioned method of (A), calculation is carried out by the following equation:

Equation 5

$$Yn = \begin{pmatrix} 0.299 & 0.587 & 0.114 \end{pmatrix} \begin{pmatrix} Cnr \\ Cng \\ Cnb \end{pmatrix} \quad (7)$$

When colors of apexes have been determined by the aforementioned method of (B), calculation is carried out by the following equation.

Equation 6

$$Yn = \begin{pmatrix} 0.299 & 0.587 & 0.114 \end{pmatrix} \begin{pmatrix} Pnr \\ Png \\ Pnb \end{pmatrix} \quad (8)$$

Furthermore, the matrix having numerical values therein is the first row of a 3×3 matrix for transformation from RGB to YIQ. For verification, the 3×3 matrix (transformation matrix) is shown below.

Equation 7

$$\begin{pmatrix} 0.299 & 0.587 & 0.114 \\ 0.596 & -0.274 & 0.322 \\ 0.212 & -0.523 & 0.311 \end{pmatrix} \quad (9)$$

FIGS. 7A to 7C show the data structure of a three-dimensional model before perspective transformation. FIG. 7A shows the data structure of the three-dimensional model having N triangular polygons in all. As shown in FIG. 7B, each of the triangular polygons has the color of material (YIQ) and three apex data index (IDX). Here, the color of the material is expressed in the YIQ system, but may be expressed in the RGB system. By using the apex data IDX, information regarding apexes can be obtained from the apex data table shown in FIG. 7C.

The apex data table stores, for each apex data IDX, the three-dimensional coordinates ($P_{nx}$, $P_{ny}$, $P_{nz}$) and normal vector ($N_{nx}$, $N_{ny}$, $N_{nz}$) of the apex (n is an apex number). Perspective transformation changes the data structure of a polygon. The data structure shown in FIG. 8 corresponds to that of FIG. 7. For each apex, the coordinate values (x, y, z) in the screen coordinate system, the color of the apex (r, g, b), and α value are to be stored. The luminosity calculated in step S27 is stored in the region where this α value is stored. Moreover, in the case where the triangle plot processing portion 205 performs processing, which will be explained in detail later, a plotting color corresponding to the luminosity range is stored in three primary colors of apex (r, g, b). Furthermore, luminosity lies within the range of 0.0 to 1.0; however, the α value is an integer to take on 0 to 255, and thus, the α value employs a value 255 times the luminosity.

Now, referring back to FIG. 6, the processing flow is explained. After step S27, the color for plotting the polygon is calculated (step S29). The color for plotting the polygon is calculated based on the reference luminosity corresponding to each luminosity range stored in the luminosity range table and the color of the polygon. For example, in the case where the color of the polygon is held as a color of the YIQ system, the color for plotting is calculated using each reference luminosity Tn and only I, Q of the Y, I, Q, based on the following equation.

Equation 8

$$\begin{pmatrix} C'nr \\ C'ng \\ C'nb \end{pmatrix} = \begin{pmatrix} 1.000 & 0.956 & 0.621 \\ 1.000 & -0.272 & -0.647 \\ 1.000 & -1.105 & 1.702 \end{pmatrix} \begin{pmatrix} Tn \\ I \\ Q \end{pmatrix} \quad (10)$$

Three plotting colors are determined for three values (T1, T2, T3) of reference luminosity Tn. Furthermore, in the case where colors of the polygon are not held as those of the YIQ system, that is, in the case where the colors are held as those of the RGB system, calculation is carried out to transform the RGB to the YIG by means of the transformation matrix shown above. In addition, in the case where colors for plotting need to be calculated at high speed, the following calculation is carried out, which may provide different results.

Equation 9

$$\begin{pmatrix} C'nr \\ C'ng \\ C'nb \end{pmatrix} = Tn \begin{pmatrix} Mr \\ Mg \\ Mb \end{pmatrix} \quad (11)$$

M denotes the color of the material of a polygon. The above-mentioned two equations provide different results of calculation and slightly different image quality; however, the second one provides an equivalent image at a higher speed.

Next, the luminosity range is selected in the luminosity range table (step S31). Furthermore, in this Example, the luminosity range table shown in FIG. 4 is used, however, the luminosity range table as shown in FIG. 9 can also be used.

Figures 8, 9:
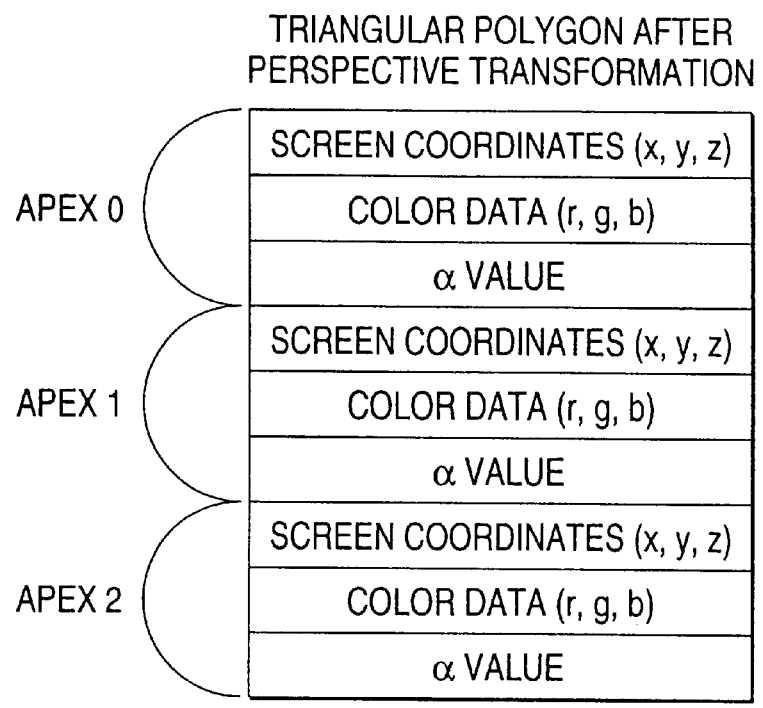
FIG. 8 shows the data structure of the triangular polygon after being converted into a perspective view, corresponding to FIG. 7B.
FIG. 9 is a table showing an example of luminosity range tables.

FIG. 9 shows an example of a table in which the luminosity range is specified by the upper and lower limits. That is, a reference luminosity of 0.75 is set for an upper limit of 1.00 and a lower limit of 0.75 of the luminosity range. A reference luminosity of 0.50 is set for an upper limit of 0.74 and a lower limit of 0.50 of the luminosity range. A reference luminosity of 0.25 is set for an upper limit of 0.49 and a lower limit of 0.00 of the luminosity range. In the case of using such a luminosity range table, a luminosity range including an upper limit and a lower limit can be selected and set at random. However, FIG. 9 shows a case of computer that employs down to the second decimal point. In the case where the luminosity range of each pixel cannot be readily compared with two values of luminosity of upper and lower limits in the luminosity comparing processing, which is explained below, the luminosity range is selected, for example, from top to bottom in FIG. 9. Then, in this case, processing is carried out with only the lower limits.

Thereafter, the luminosity of the apexes of a polygon is interpolated to calculate the luminosity of each pixel inside the polygon (a luminosity distribution of the polygon). Although the colors of the apexes are also interpolated, the same result is provided since the three apexes have the same color for plotting. Then, if the luminosity of the pixel lies within the luminosity range selected, plotting is carried out with the color for plotting corresponding to the luminosity range selected (step S33). The interpolation processing of luminosity is carried out, for example, by the triangle plot processing portion 205 of FIG. 2. The comparing processing to determine whether the luminosity of each pixel lies within the luminosity range selected is carried out, for example, by the pixel color processing portion 209. These steps of S31 and S33 are repeated until processing is performed for all luminosity ranges (step S35).

For example, in the case where the pixel color processing portion 209 cannot handle two values of luminosity of upper and lower limits, the same effect can be obtained by using the Z buffer 211 at the same time. The Z buffer 211 is also used for hidden surface removal, but provides the same effect as the upper limit comparing function of luminosity in this Example.

For example, in the case where the luminosity range table shown in FIG. 4 is available, a threshold value of 0.75 is first selected. Then, in accordance with a command from the operational processing portion 203, the triangle plot processing portion 205 interpolates the luminosity and coordinates (including the Z value) of each apex of the polygon to go on with the calculation of the luminosity and coordinates (including the Z value) of each pixel. Furthermore, if the colors of the three apexes are set to the color for plotting corresponding to a threshold value of 0.75, the color of each pixel would have the color for plotting even after interpolation.

The pixel color processing portion 209 compares the luminosity of a pixel with the threshold value of 0.75 in accordance with the command from the operational processing portion 203. In addition, the pixel color processing portion 209 compares the Z value of the pixel determined by interpolation with the Z value of the pixel that is stored in the Z buffer 211. If the luminosity of the pixel is equal to or greater than 0.75 and the Z value of the pixel determined by interpolation is less than the Z value of the pixel that is stored in the Z buffer 211, the pixel color processing portion 209 writes the color for plotting corresponding to the threshold value of 0.75 to the frame buffer 213 as the color of the pixel.

Figure 10A:
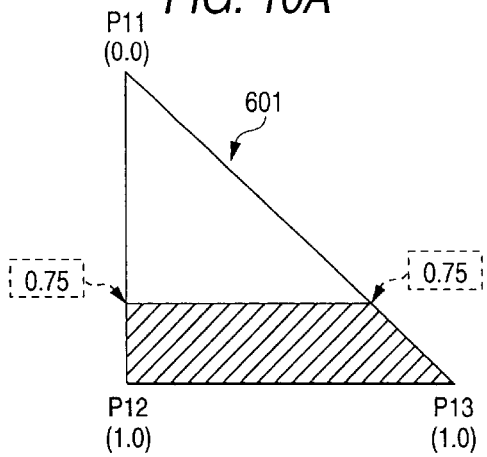
FIG. 10A is a view showing a first example which shows a region to be plotted when a threshold value of 0.75 is set.
Figure 10B:
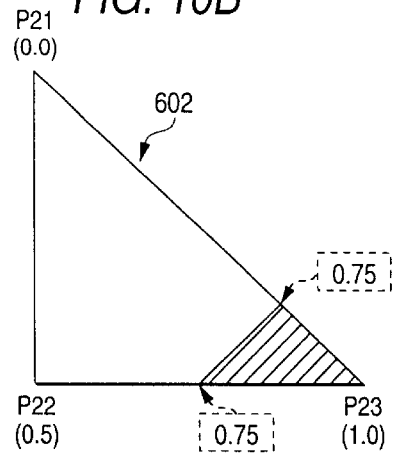
FIG. 10B is a view showing a second example which shows a region to be plotted when a threshold value of 0.75 is set.

If the polygon is plotted for the first time and the luminosity is equal to or greater than 0.75, the color for plotting is written. FIGS. 10A and 10B show examples of a triangular polygon 601 and a triangular polygon 602, respectively. Each value of luminosity of apexes P11, P12, P13 of the triangular polygon 601 are set to 0.0, 1.0, and 1.0, respectively. Each value of luminosity of apexes P21, P22, P23 of the triangular polygon 602 are set to 0.0, 0.5, and 1.0, respectively. When the aforementioned processing is carried out, portions to be shaded in each triangular polygon are colored with the color for plotting.

Next, a threshold value of 0.5 is selected. Then, in accordance with a command from the operational processing portion 203, the triangle plot processing portion 205 calculates the luminosity and coordinates (including the Z value) of each pixel inside the polygon. The pixel color processing portion 209 compares the luminosity of a pixel with the threshold value of 0.5 in accordance with the command from the operational processing portion 203. In addition, the pixel color processing portion 209 compares the Z value of the pixel determined by calculation with the Z value of the pixel that is stored in the Z buffer 211. If the luminosity of the pixel is equal to or greater than 0.5 and the Z value of the pixel determined by calculation is less than the Z value of the pixel that is stored in the Z buffer 211, the pixel color processing portion 209 writes the color for plotting corresponding to the threshold value of 0.5 to the frame buffer 213 as the color of the pixel.

Figure 10C:
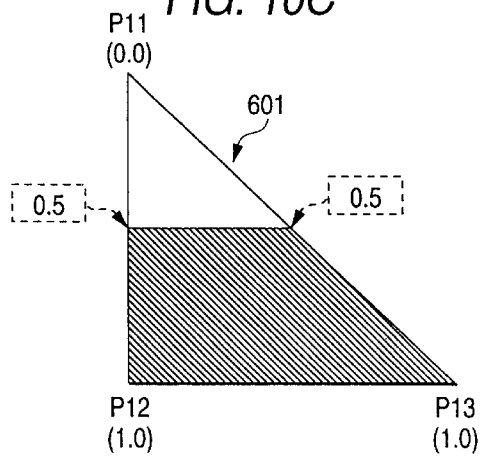
FIG. 10C is a view showing a first example which shows a region to be plotted when a threshold value of 0.5 is set.
Figure 10D:
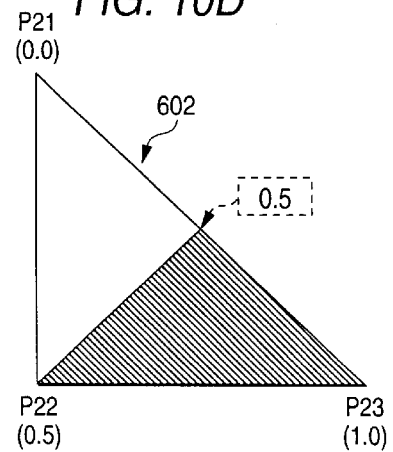
FIG. 10D is a view showing a second example which shows a region to be plotted when a threshold value of 0.5 is set.
Figure 10E:
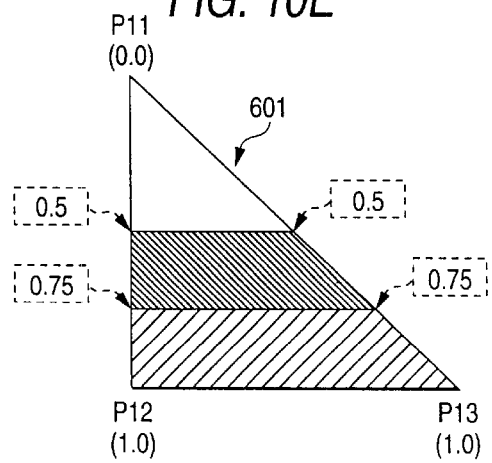
FIG. 10E is a view showing a first example which shows a region to be plotted when a threshold value of 0.75 is set and a Z buffer value is used.
Figure 10F:
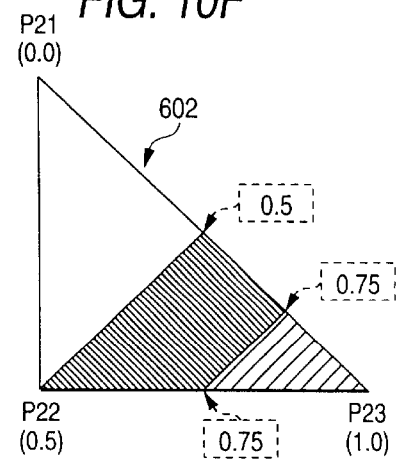
FIG. 10F is a view showing a second example which shows a region to be plotted when a threshold value of 0.75 is set and a Z buffer value is used.

FIGS. 10C and 10D each show an example of a region to be plotted when a threshold value of 0.5 is set. If the Z buffer 211 is not used, the region of luminosity of 1.0 to 0.5 is colored with a color for plotting corresponding to a threshold value of 0.5, as shown in FIGS. 10C and 10D. Since the Z value that is stored in the Z buffer 211 is the Z value determined by calculation for the region with luminosity 0.75 or greater, the color for plotting corresponding to a threshold value of 0.5 is not written to the frame buffer 213 for the region with luminosity 0.75 or greater. FIGS. 10E and 10F each show an example of a region to be plotted when the Z value is used. That is, as shown in FIGS. 10E and 10F, the region with luminosity of 0.5 to 0.74 and the region with luminosity of 0.75 or greater are colored with different colors for plotting.

Figure 11A:
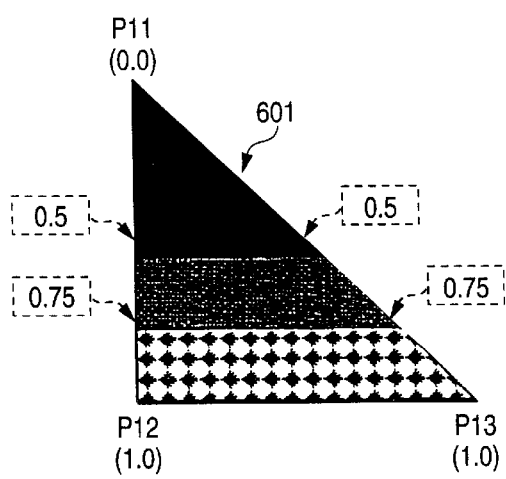
FIG. 11A is a view showing a first example of an image provided when a triangular polygon is plotted according to the Example.
Figure 11B:
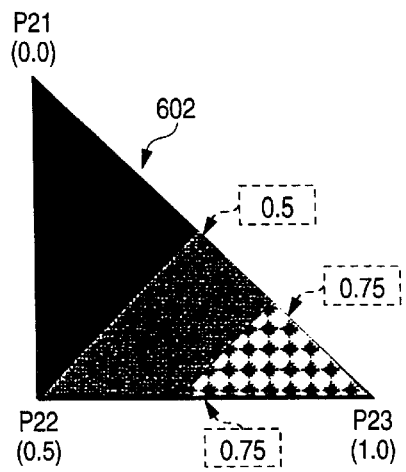
FIG. 11B is a view showing a second example of an image provided when a triangular polygon is plotted according to the Example.

FIGS. 11A and 11B show the results obtained by carrying out the same processing as in the example of FIG. 4 with a threshold value of 0.0. Each value of luminosity of apexes P11, P12, P13 of the triangular polygon 601 in FIG. 11A are set to 0.0, 1.0, and 1.0, respectively. Each value of luminosity of apexes P21, P22, P23 of the triangular polygon 602 in FIG. 11B are set to 0.0, 0.5, and 1.0, respectively. The numerical values circled by dashed lines, that is, 0.5 and 0.75 show threshold values of luminosity. As such, each triangular polygon is divided into three regions to be colored with the color for plotting.

Figure 12A:
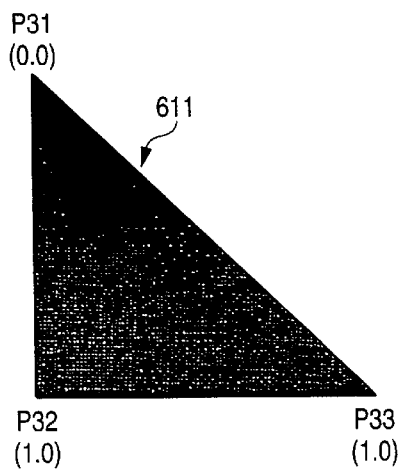
FIG. 12A is a view showing a first example of an image provided when a triangular polygon is plotted according to a prior art.
Figure 12B:
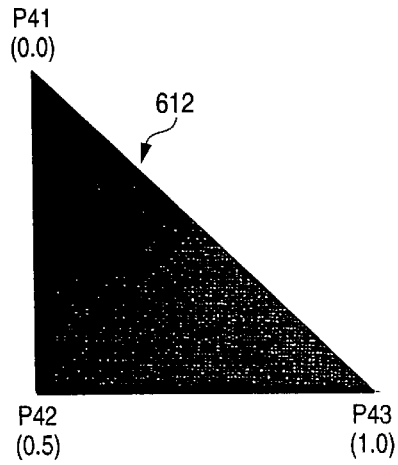
FIG. 12B is a view showing a second example of an image provided when a triangular polygon is plotted according to a prior art.

FIGS. 12A and 12B show the result of the Gouraud shading. Each value of luminosity of apexes P31, P32, P33 of the triangular polygon 611 in FIG. 12A are set to 0.0, 1.0, and 1.0, respectively. Each value of luminosity of apexes P41, P42, P43 of the triangular polygon 612 in FIG. 12B are set to 0.0, 0.5, and 1.0, respectively. That is, the luminosity of each apex is the same as that of the triangular polygons 601 and 602, which are shown in FIGS. 11A and 11B. However, in the Gouraud shading, the luminosity changes smoothly due to interpolation, whereas luminosity changes only at boundaries of regions defined in FIGS. 11A and 11B. That is, there are three regions with flat luminosity and thus it can be found that the regions look like cell animation.

Furthermore, in some cases, the lower limit smallest in the luminosity range table is not equal to 0.0. In order to eliminate such portions as are colored with no color inside a polygon, steps S31 and S33 are carried out with a lower limit value of 0.0 at the last repetition in the repetition of step S35 of FIG. 6.

Steps S25 to S35 are repeated until processing has completed for all polygons (step S37). This allows all polygons of a three-dimensional model to be shaded with predetermined levels of luminosity, and thus, a cell-animation-looking image to be obtained. Furthermore, the processing can be carried out at high speed by means of a computer, and therefore, real time plotting can be implemented.

It is preferable to prepare an optimum luminosity range table for each of three-dimensional models. However, three-dimensional models may be divided into some categories to prepare a luminosity range table for each of the categories. The number of luminosity ranges included in the luminosity range table may be 2 or 3 to the actual cell animation. However, it is readily made possible to increase the number to 2 or more since this simply causes the number of repetitions to increase in step S35 of FIG. 6 in the processing described above. However, it is natural that the processing is carried out at a slower speed as the number of repetition increases.

2. EXAMPLE 2

Unlike Example 1, Example 2 does not allow colors for plotting to be calculated in real time, but instead, they are stored as data by carrying out the calculations in advance. This makes the processing speed lower than that of Example 1. Furthermore, since the color for plotting is calculated in accordance with the color of the material of a polygon and the reference luminosity of the luminosity range table, one polygon may only have data for one color. However, it is necessary in Example 2 for a polygon to hold color data for the lines of the luminosity range table.

Figure 13:
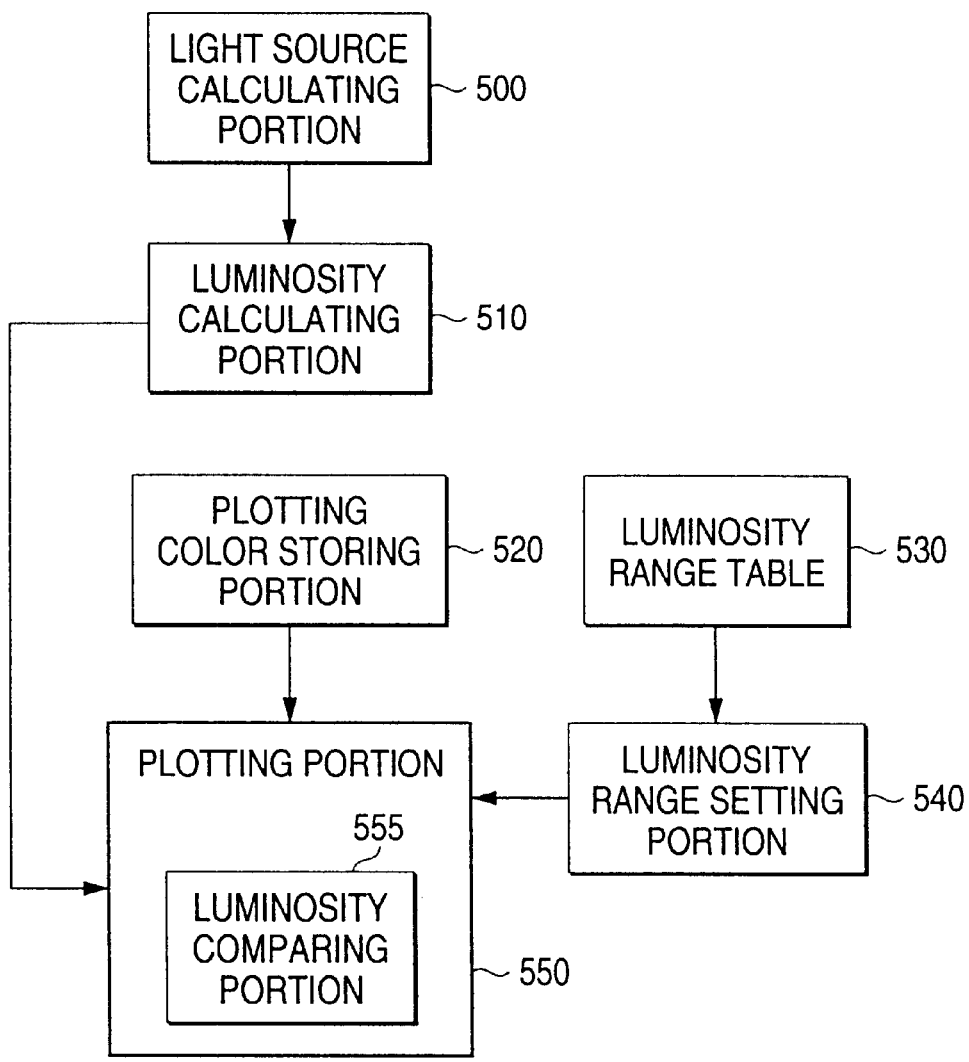
FIG. 13 is a functional block diagram showing Example 2.

FIG. 13 shows a functional block diagram of Example 2. Example 2 includes a light source calculating portion 500, a luminosity calculating portion 510, a luminosity range table 530, a luminosity range setting portion 540, a plotting portion 550 comprising a luminosity comparing portion 555, and a plotting color storing portion 520. What is different from Example 1 is the inclusion of the plotting color storing portion 520 instead of the plotting color calculating portion 420.

It is necessary for the plotting color storing portion 520 to store three pieces of plotting color data for each polygon when the luminosity range table as shown in FIG. 4. That is, when N polygons are available, the plotting color storing portion 520 stores $(C'_{o1r}, C'_{o1g}, C'_{o1b})$ corresponding to the first luminosity range of polygon 0, $(C'_{o2r}, C'_{o2g}, C'_{o2b})$ corresponding to the second luminosity range of polygon 0, $(C'_{o3r}, C'_{o3g}, C'_{o3b})$ corresponding to the third luminosity range of polygon 0, . . . , $(C'_{o(N-1)1r}, C'_{o(N-1)1g}, C'_{o(N-1)1b})$ corresponding to the first luminosity range of polygon N–1, $(C'_{o(N-1)2r}, C'_{o(N-1)2g}, C'_{o(N-1)2b})$ corresponding to the second luminosity range of polygon N–1, and $(C'_{o(N-1)3r}, C'_{o(N-1)3g}, C'_{o(N-1)3b})$ corresponding to the third luminosity range of polygon N–1.

The plotting portion 550 takes colors for plotting corresponding to the luminosity range that is set by the luminosity range setting portion 540 out of the plotting color storing portion 520. The plotting color storing portion 520 is, for example, the CD-ROM 131 or the HDD 107.

The light source calculating portion 500 carries out perspective transformation of each apex of a polygon inside a three-dimensional model disposed in a virtual three-dimensional space to carry out the light source calculation for each apex of the polygon that has been subjected to the perspective transformation. Then, the luminosity calculating portion 510 calculates luminosity Y based on the color of each apex of the polygon that has been calculated by the light source calculating portion 500. The luminosity of each apex of the polygon is outputted to the plotting portion 550. For example, when the luminosity range table 530 as shown in FIG. 4 is available, the luminosity range setting portion 540 selects one threshold value from top to bottom in sequence from the luminosity range table 530 to set the threshold value to the plotting portion 550.

The plotting portion 550 interpolates the luminosity of each apex of the polygon that is outputted from the luminosity calculating portion 510 to calculate the luminosity of each pixel inside the polygon. Here, the Z value of each apex is interpolated and the Z value of each pixel inside the polygon is calculated. This calculation is carried out, for example, in the triangle plot processing portion 205 of FIG. 2. Then, the luminosity comparing portion 555 compares the luminosity of each pixel and the threshold value that has been set by the luminosity range setting portion 540, and the current Z value of the pixel is taken out of the Z buffer to be compared with the Z value calculated by interpolation. If the luminosity of the pixel is greater than the threshold value and the current Z value is less than the Z value calculated by interpolation, the pixel is plotted with the color for plotting corresponding to this threshold value.

If the luminosity of the pixel is less than the threshold value or the current Z value is equal to or greater than the Z value calculated by interpolation, this pixel is not plotted at this stage. The plot processing including this comparing processing is carried out, for example, in the pixel color processing portion 209 of FIG. 2. If the luminosity range setting portion 540 has completed setting of all threshold values of the luminosity range table 530 and the plotting portion 550 has accordingly carried out processing for all pixels inside the polygon, the inside of the polygon is shaded in three levels in the example of FIG. 4.

Entire Processing Flow

As is shown in FIG. 5, the entire processing flow of Example 1 is the same as that of Example 2. That is, the state of the inside of a virtual space is first set (step S2). Then, the three-dimensional model plot processing in Example 2 is carried out (step S3). This is explained in more detail with reference to FIG. 14. Then, steps S2 and S3 are repeated until the processing is completed (step S4).

Figure 14:
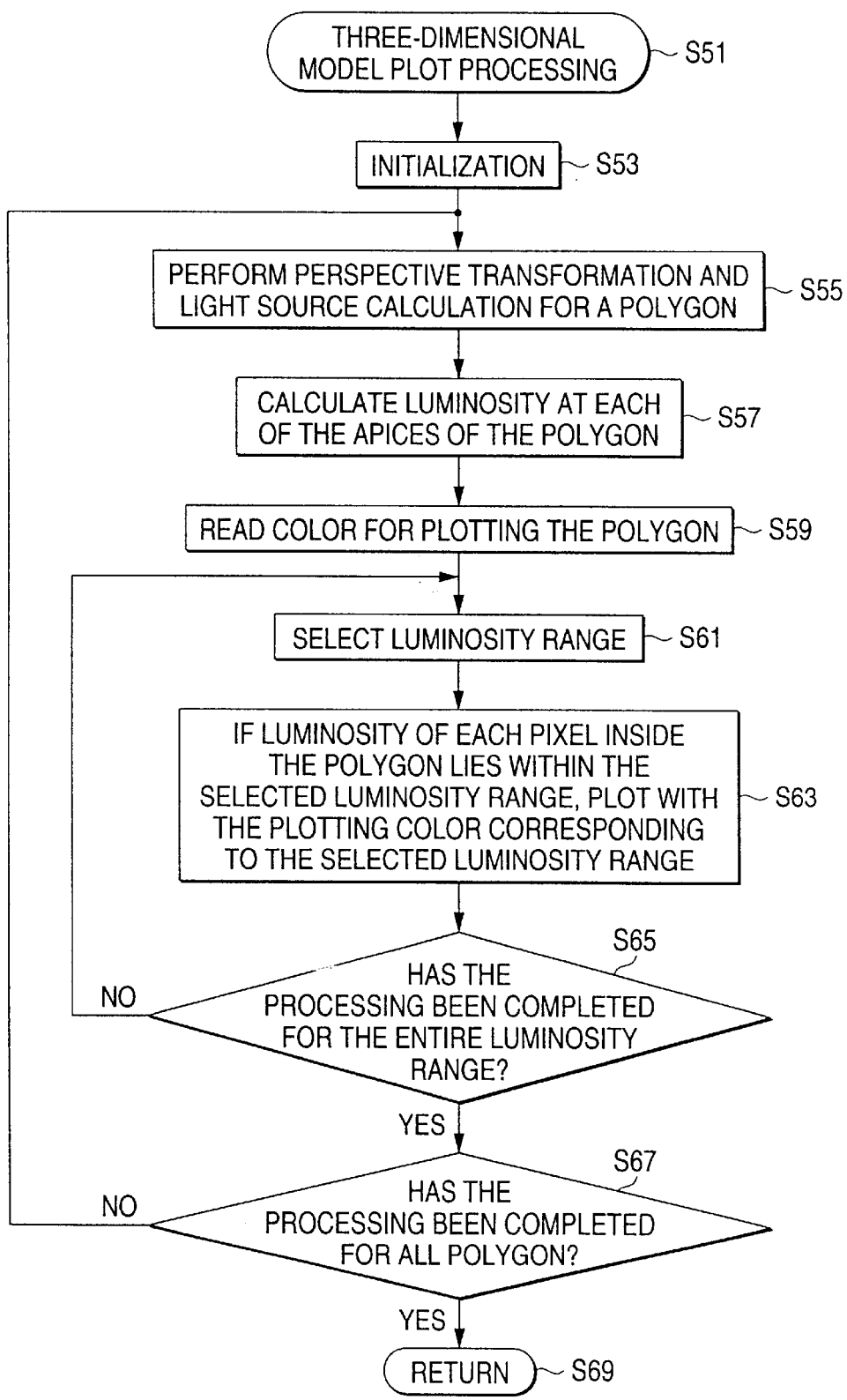
FIG. 14 is a flow diagram showing the plotting processing of a three-dimensional model in the Example 2.

FIG. 14 shows the flow of the three-dimensional model plot processing in Example 2. What is different from FIG. 6 is that the contents of the processing of the initialization in step S53 of FIG. 14 is different from those of step S23 of FIG. 6 and step S59 of FIG. 14 is substituted for step S29 of FIG. 6. That is, the color for plotting is calculated each time in FIG. 6; however, the color is calculated and stored in advance in Example 2. This makes it necessary in step 53 to read the plotting color data for the three-dimensional model to be plotted. It is also necessary to read the color for plotting a polygon in step S59. Furthermore, step S59 may be carried out before steps S55 and S57, after step 61, or in parallel to these steps. Since the data is calculated and stored in advance, the data may be safely read until it is actually used.

FIG. 14 will now be explained. First, initialization is carried out (step S53). In this initialization, a luminosity range table and plotting color data, corresponding to a three-dimensional model, are obtained. Next, perspective transformation and light source calculation are carried out for a polygon of the three-dimensional model (step S55).

The methods, which have been explained in Example 1, that is, (A) a method for considering the color of the material defined for the polygon and (B) a method for considering no color of the material, are also applicable to Example 2.

Next, the luminosity of each apex of the polygon is calculated (step S57). Then, the color for plotting the polygon is read out (step S59). Then, the luminosity range is selected in the luminosity range table (step S61). Here, the luminosity range table shown in FIG. 4 is used, and the luminosity range is selected and set in FIG. 4 from top to bottom in sequence. Thereafter, the luminosity of the apexes of the polygon is interpolated to calculate the luminosity of each pixel inside the polygon.

Then, if the luminosity of the pixel lies within the selected luminosity range, plotting is carried out with the color for plotting corresponding to the luminosity range selected (step S63). The interpolation processing of luminosity is carried out, for example, by the triangle plot processing portion 205 of FIG. 2. The comparing processing to determine whether the luminosity of each pixel lies within the luminosity range selected is carried out, for example, by the pixel color processing portion 209. Steps S61 and S63 are repeated until processing is performed for all luminosity ranges (step S65).

In step S63, the Z buffer 211 is used at the same time. In the case where the luminosity range table as shown in FIG. 4 is available, a threshold value of 0.75 is first selected. Then, in accordance with a command from the operational processing portion 203, the triangle plot processing portion 205 interpolates the luminosity and coordinates (including the Z value) of each apex of the polygon to go on with the calculation of the luminosity and coordinates (including the Z value) of each pixel. The pixel color processing portion 209 compares the luminosity of a pixel with the threshold value of 0.75 in accordance with the command from the operational processing portion 203. In addition, the pixel color processing portion 209 compares the Z value of the pixel determined by interpolation with the Z value of the pixel that is stored in the Z buffer 211.

If the luminosity of the pixel is equal to or greater than 0.75 and the Z value of the pixel determined by interpolation is less than the Z value of the pixel that is stored in the Z buffer 211, the pixel color processing portion 209 writes the color for plotting corresponding to the threshold value of 0.75 to the frame buffer 213 as the color of the pixel. Next, a threshold value of 0.5 is selected. Then, in accordance with a command from the operational processing portion 203, the triangle plot processing portion 205 calculates the luminosity and coordinates (including the Z value) of each pixel inside the polygon. The pixel color processing portion 209 compares the luminosity of a pixel with the threshold value of 0.5, and compares the Z value of the pixel determined by calculation with the Z value of the pixel that is stored in the Z buffer 211.

If the luminosity of the pixel is equal to or greater than 0.5 and the Z value of the pixel determined by calculation is less than the Z value of the pixel that is stored in the Z buffer 211, the pixel color processing portion 209 writes the color for plotting corresponding to the threshold value of 0.5 to the frame buffer 213 as the color of the pixel. Since the Z value that is stored in the Z buffer 211 is the Z value determined by calculation for the region with luminosity 0.75 or greater, the color for plotting corresponding to a threshold value of 0.5 is not written to the frame buffer 213 for the region with luminosity 0.75 or greater. Likewise, the threshold value of 0.0 is processed.

Steps S55 to S67 are repeated until processing has been completed for all polygons (step S67). This allows all polygons of a three-dimensional model to be shaded with predetermined levels of luminosity, and thus, a cell-animation-looking image to be obtained. Furthermore, the processing can be carried out at high speed by means of a computer and therefore real time plotting can be implemented. In particular, Example 2 can be carried out at much higher speed than Example 1.

3. Other Modifications (1) In Example 1, in FIG. 6 showing the three-dimensional model plot processing, processing for calculating the color for plotting the polygon is carried out after steps S25 and S27 as step S29. However, no problem would occur if the color is calculated until the color for plotting is used in step S33. Therefore, step S29 may be carried out before steps S25 and S27, in parallel to steps S25 and S27, after step 31, or in parallel to step S31.

(2) In step S27, in FIG. 6 showing the three-dimensional model plot processing of Example 1, calculated is luminosity Y of an apex of the polygon after the light source calculation in the YIQ transformation. The processing can be carried out at a higher speed if I and Q resulted from the YIQ transformation are not calculated since they are not used. However, when such a routine or the like is already available as carries out the YIQ transformation, it may be used to calculate I and Q.

This also holds true in Example 2.

(3) In step S33, in FIG. 6 showing the three-dimensional model plot processing of Example 1, the data of an apex of a polygon is interpolated to generate data of a pixel inside the polygon. Since this processing, if once carried out, is not changed even when a different luminosity range is selected and set in the repetition of step S35, the result may be stored and used.

This also holds true in Example 2.

(4) In step S25, in FIG. 6 showing the three-dimensional model plot processing of Example 1, the light source calculation is carried out as well as the perspective transformation. However, the perspective transformation may be safely carried out before step S33. However, it is better to exclude the transformation from the loop of step S35, thereby avoiding repeating the perspective transformation several times. Therefore, execution at the time of step S25 can reduce the amount of calculation.

This also holds true in Example 2.

(5) In Example 2, the color for plotting corresponding to a luminosity range is calculated and stored in advance. The method for carrying out the calculation in advance may be either one of the two methods explained in Example 1, or other method. Furthermore, the color for plotting may be defined one by one. In Example 2, the execution speed can be made faster since the color for plotting is prepared in advance, but the colors for plotting prepared cannot be readily changed to other colors. In contrast, in the case where the calculation is carried out upon the execution by using the reference luminosity defined in the luminosity range table as in Example 1, this provides such an effect as makes it possible to change the color for plotting only by changing the luminosity range table or the reference luminosity.

(6) Changing Hardware Used

In the aforementioned Examples, such Examples have been disclosed as allowing the graphics processing portion 111 to perform processing of part of the three-dimensional model plot processing (step S3 of FIG. 5). However, the entire three-dimensional model plot processing may be performed by either the graphics processing portion 111 or the operational processing portion 103.

Furthermore, FIG. 1 shows a single example and can be subjected to a variety of modifications. For example, a game device without the HDD 107 could supply programs and data only from the CD-ROM 131. At that time, in place of the HDD 107, a memory card read/write interface for storing data would be provided in the interface portion 117. In addition, the communication interface 115 may be optionally provided. The present invention does not directly relate to sound processing and therefore the sound processing portion 109 is not required.

Furthermore, the CD-ROM 131 is an example of a recording medium. Other recording medium such as a floppy disc, a magneto optical disc, a DVD-ROM, and a memory cartridge may be employed. In that case, the CD-ROM drive 113 needs to be made agree with the corresponding medium.

Furthermore, the foregoing allows the present invention to be implemented by a computer program. The present invention can also be implemented by combining the computer program with a purpose-specific device, such as, for example, electronic circuitry or a purpose-specific device such as electronic circuitry. At that time, a device may be provided for each of the functions shown in each step of FIGS. 5, 6, and 14. Alternatively, a device may be provided for part of the functions or for a combination of the functions.

In the foregoing, the present invention has been explained specifically with reference to the Examples. However, the present invention is not limited to the aforementioned Examples and may be modified as appropriate without deviating from the scope of the invention. For example, in the aforementioned Examples, such cases have been described as implement the present invention with an ordinary computer being employed as a platform. However, the present invention may be implemented with a domestic game device or an arcade game device being employed as the platform. In some cases, the present invention can be implemented with a mobile information terminal, the car navigation system or the like as the platform.

In addition, programs or data for implementing the present invention may be provided without being limited to a recording medium such as a CD-ROM, which can be attached to and detached from a computer or a game device. That is, programs and data for implementing the present invention may be recorded in a memory of other device on the network 151 connected to the communication interface 115 shown in FIG. 1 via the communication medium 141. The programs and data may be stored for use in the memory 105 in sequence via the communication medium 141 as required.

Figure 15:
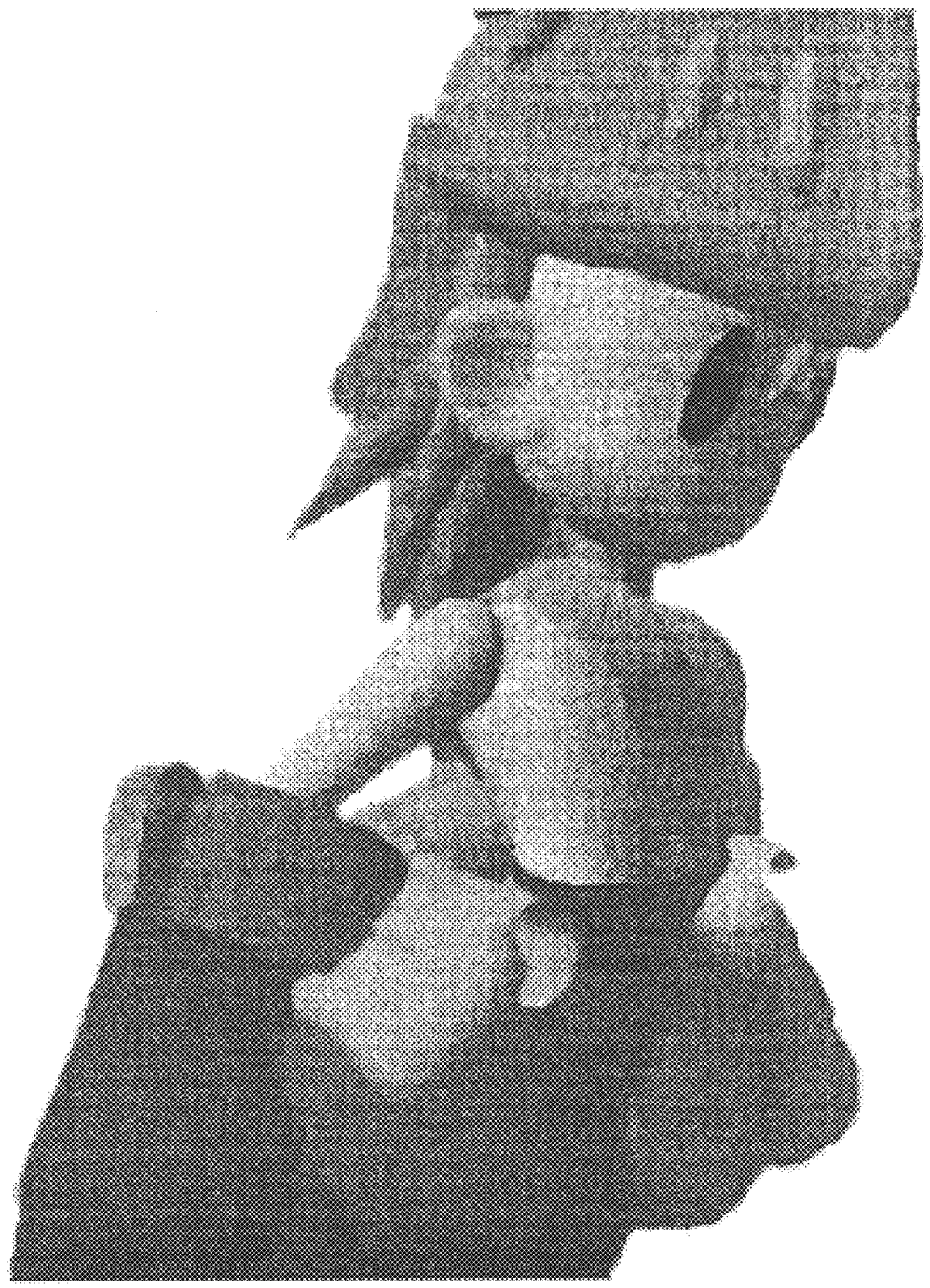
FIG. 15 is a display example of an image rendered by the prior art.
Figures 16, 17:
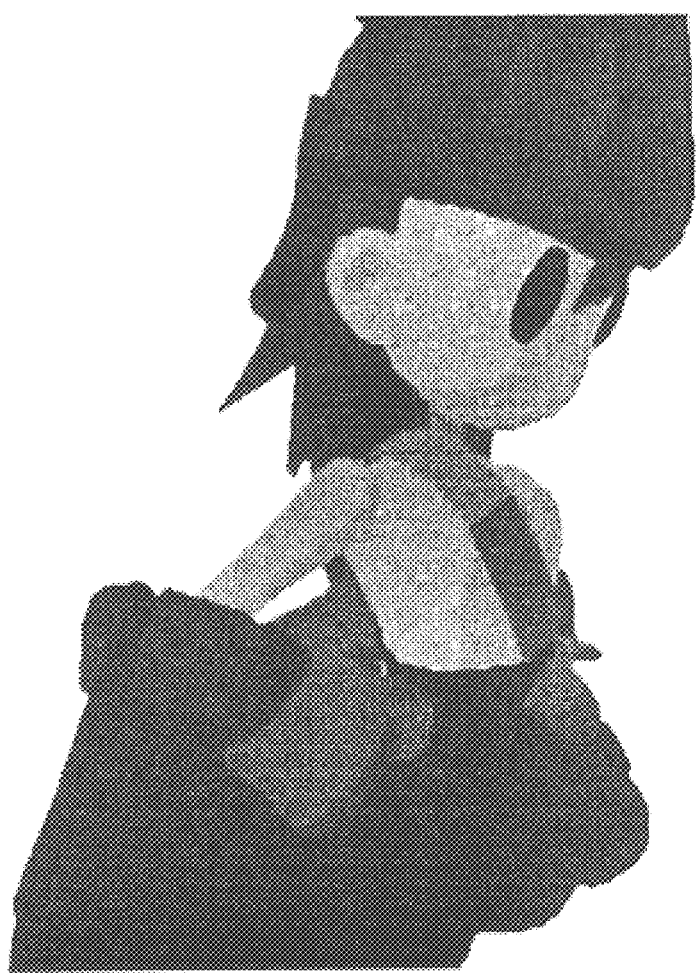
FIG. 16 is a display example of an image rendered by the present invention.
FIG. 17 is a table showing an example of the luminosity range table used in the rendering of FIG. 16.

FIG. 15 shows a display example of an image in a case where the present invention is not employed, that is, the case where the color of each pixel inside the polygon is interpolated with the color of an apex of the polygon. For example, it can be seen that the luminosity changes gradually, at the central portion of the image, from a portion around the ear of the face of the man toward the face of the man on the right. On the other hand, FIG. 16 shows a display example of an image where the image is plotted using a luminosity range table in which two luminosity ranges (threshold values) are defined and the algorithm of the present invention. The luminosity range table used in FIG. 16 is shown in FIG. 17. Here, two levels are set as the reference luminosity of 0.75 for a threshold value of 0.3125 and the reference luminosity of 0.60 for a threshold value of 0. Unlike FIG. 15, in FIG. 16, it can be seen that two levels of luminosity are used for shading from a portion around the ear of the face of the man toward the face of the man on the right.

A cell-animation-looking image can be obtained using the algorithm of the present invention. The present invention simply carries out the extra processing in which the α value for storing luminosity is compared with a luminosity range at the time of writing to the frame buffer to determine whether a predetermined color for plotting can be written. Thus, the present invention can be readily switched over to respond to generating an image as shown in FIG. 15 by means of a prior art and to generating an image as shown in FIG. 16 by the algorithm of the present invention. Furthermore, in the case where the cell animation is drawn by a human hand, it is time-consuming to prepare images, for example, of a character in a variety of states. Moreover, images of characters viewed from many angles cannot be prepared because of the same reason even in a game where cell-animation-looking game characters are displayed. However, the present invention can be used to obtain readily cell-animation-looking images in a number of states, the time required for the preparation being greatly reduced.

As described above, the rendering method and device, and the computer readable recording medium on which a rendering program is stored, according to the present invention, are adapted to define the color of the inside of a polygon by a representative luminosity assigned to a level of luminosity. A cell-animation-looking color can thereby be implemented.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in Japanese Patent Application No. HEI 11-260046, filed on Sep. 14, 1999, the disclosure of which is expressly incorporated herein by reference in its entirety.

What is claimed is:

1. A rendering method for rendering a three-dimensional model disposed in a virtual space and comprising a plurality of polygons, the rendering method comprising:

calculating, for each of the polygons, a luminosity at a position of each pixel inside each of the polygons;

dividing the luminosity into a plurality of luminosity levels of various ranges;

assigning a representative luminosity to each of the luminosity levels;

determining in which luminosity level the calculated luminosity is included at the position of each pixel inside each of the polygons;

generating a color of each pixel in accordance with the representative luminosity assigned to the determined luminosity level and a predetermined color of each of the polygons; and plotting each pixel inside each of the polygons in the generated color.

2. A rendering method for rendering a three-dimensional model disposed in a virtual space and comprising a plurality of polygons, the rendering method comprising:

dividing a luminosity into a plurality of luminosity levels of various ranges;

associating each of the luminosity levels with a reference luminosity;

selecting the luminosity levels individually;

calculating, each time said luminosity level is selected, luminosity at a position of each pixel inside said polygons in accordance with a luminosity predetermined for each of a plurality of apexes of said polygons, and plotting, only when a luminosity at the position of each pixel lies within a range of luminosity corresponding to said selected luminosity level, the pixel with a color in accordance with the reference luminosity corresponding to said selected luminosity level and a color predetermined for said polygons.

3. The rendering method according to claim 2, comprising:

calculating a color in accordance with the reference luminosity corresponding to said selected luminosity level and the color predetermined for said polygons, each time said luminosity level is selected;

calculating a luminosity at a position of each pixel inside said polygons in accordance with the luminosity predetermined for each of apexes of said polygons at the time of plotting; and plotting the pixel with the calculated color only when a luminosity at the position of each pixel lies within a range of luminosity corresponding to said selected luminosity level.

4. The rendering method according to claim 2, comprising:

calculating a color for each luminosity level in said polygons in accordance with each reference luminosity associated in advance with each of said luminosity levels and the color predetermined for the polygons before the luminosity level is selected;

associating the color to each luminosity level, and plotting the pixel by employing the color associated with the selected luminosity level as a color in accordance with the reference luminosity corresponding to the selected luminosity level and the color predetermined for said polygons at the time of plotting.

5. The rendering method according to claim 2, further comprising:

deriving and setting the luminosity at each of the plurality of apexes of the polygons by a light source calculation for the three-dimensional model before the luminosity level is selected.

6. The rendering method according to claim 5, comprising:

deriving and setting the luminosity at each of the plurality of apexes of the polygons in accordance with a normal vector of each apex and information regarding light sources at the time of deriving and setting the luminosity.

7. The rendering method according to claim 2, comprising:

selecting luminosity levels one by one from two or three luminosity levels defined in advance at the time of selecting the luminosity.

8. A rendering device that renders a three-dimensional model disposed in a virtual space and comprising a plurality of polygons, the rendering device comprising:

a calculator, for each of said polygons, that calculates a luminosity at a position of each pixel inside each of the polygons;

a divider that divides the luminosity into a plurality of luminosity levels of various ranges;

an assignor that assigns a representative luminosity to each of the luminosity levels;

a determiner that determines in which luminosity level the calculated luminosity is included at the position of each pixel inside each of the polygons;

a generator that generates a color of each pixel in accordance with the representative luminosity assigned to the determined luminosity level and a predetermined color of each of the polygons; and a plotter that plots each pixel inside each of the polygons in the generated color.

9. A rendering device that renders a three-dimensional model disposed in a virtual space and comprising a plurality of polygons, the rendering device comprising:

a divider that divides a luminosity into a plurality of luminosity levels of various ranges;

an associator that associates each of the luminosity levels with a reference luminosity;

a selector that selects, with luminosity being divided into levels within a certain range, luminosity levels individually from a plurality of luminosity levels, each level being associated in advance with a reference luminosity, and a plotter that calculates, each time said luminosity level is selected, luminosity at a position of each pixel inside said polygons in accordance with a luminosity predetermined for each of said plurality of apexes of said polygons, and that plots, only when a luminosity at the position of each pixel lies within a range of luminosity corresponding to said selected luminosity level, the pixel with a color in accordance with the reference luminosity corresponding to said selected luminosity level and a color predetermined for said polygons.

10. A computer readable recording medium that stores a program for rendering a three-dimensional model disposed in a virtual space and comprising a plurality of polygons, said computer readable recording medium on which said program is stored instructing said computer to:

calculate, for each of the polygons, luminosity at a position of each pixel inside each of the polygons;

divide the luminosity into a plurality of luminosity levels of various ranges;

assign a representative luminosity to each of the luminosity levels;

determine in which luminosity level the calculated luminosity is included at the position of each pixel inside each of the polygons;

generate a color of each pixel in accordance with the representative luminosity assigned to the determined luminosity level and a predetermined color of the polygon; and plot each pixel inside the polygon in the generated color.

11. A computer readable recording medium in which a program for rendering a three-dimensional model disposed in a virtual space and comprising a plurality of polygons is stored, said computer readable recording medium on which said program is stored instructing said computer to:

divide a luminosity into a plurality of luminosity levels of various ranges;

associate each of the luminosity levels with a reference luminosity;

select, with luminosity being divided into levels, the luminosity levels individually from a plurality of luminosity levels having been associated in advance with a reference luminosity;

calculate, each time said luminosity level is selected, luminosity at a position of each pixel inside said polygons in accordance with a luminosity predetermined for each of a plurality of apexes of said polygons; and plot, only when a luminosity at the position of each pixel lies within a range of luminosity corresponding to said selected luminosity level, the pixel with a color in accordance with the reference luminosity corresponding to said selected luminosity level and a color predetermined for said polygons.

12. The computer readable recording medium according to claim 11, wherein said program further instructs said computer to:

calculate, each time a luminosity level is selected, a color in accordance with a reference luminosity corresponding to said selected luminosity level and the color predetermined for said polygons, and said luminosity at a position of each pixel inside said polygons being calculated in accordance with the luminosity predetermined for each of the plurality of apexes of said polygons; and plot, only when a luminosity at the position of each pixel lies within a range of luminosity corresponding to said selected luminosity level, the pixel with a calculated color.

13. The computer readable recording medium according to claim 11, wherein said program further instructs said computer to:

calculate, before said luminosity levels are selected, a color for each luminosity level in said polygons in accordance with each reference luminosity associated in advance with each of said luminosity levels and the color predetermined for said polygons;

associate the color to each luminosity level; and plot said pixel by employing the color associated with said selected luminosity level as a color in accordance with the reference luminosity corresponding to said selected luminosity level and the color predetermined for said polygons.

14. The computer readable recording medium according to claim 11, wherein said program further instructs said computer to derive and set a luminosity at each of the plurality of apexes of said polygons by a light source calculation for said three-dimensional model.

15. A game device that renders a three-dimensional model disposed in a virtual space and comprising a plurality of polygons, the game device comprising:

a computer, and a reader that reads a program, from a computer readable recording medium on which the program to be executed by said computer is recorded, wherein said program instructs said computer to:

calculate, for each of the polygons, a luminosity at a position of each pixel inside each of the polygons;

divide the luminosity into a plurality of luminosity levels of various ranges;

assign a representative luminosity to each of the luminosity levels;

determine in which luminosity level the calculated luminosity is included at the position of each pixel inside each of the polygons;

generate a color of each pixel in accordance with the representative luminosity assigned to the determined luminosity level and a predetermined color of each of the polygons; and plot each pixel inside each of the polygons in the generated colors.

16. A game device that renders a three-dimensional model disposed in a virtual space and comprising a plurality of polygons, the game device comprising:

a computer, and a reader that reads a program, from a computer readable recording medium on which the program to be executed by said computer is recorded, wherein said program instructs said computer to:

divide a luminosity into a plurality of luminosity levels of various ranges;

associate each of the luminosity levels with a reference luminosity;

select luminosity levels individually from the plurality of luminosity levels having been associated in advance with a reference luminosity;

calculate with a plotting function each time a luminosity level is selected, luminosity at a position of each pixel inside each of said polygons in accordance with a luminosity predetermined for each of a plurality of apexes of said polygons; and plot with a plotting function, only when a luminosity at the position of each pixel lies within a range of luminosity corresponding to said selected luminosity level, the pixel with a color in accordance with the reference luminosity corresponding to said selected luminosity level and a color predetermined for said polygons.

17. A game device that renders a three-dimensional model disposed in a virtual space and comprising a plurality of polygons, the game device comprising:

a computer, a reader that reads a program, from a computer readable recording medium on which the program to be executed by said computer is recorded, a calculator that calculates, for each of the polygons and in accordance with said program, luminosity at a position of each pixel inside each of the polygons;

a divider that divides the luminosity into a plurality of luminosity levels of various ranges;

an assigner that assigns a representative luminosity to each of the luminosity levels;

a determiner that determines to which luminosity level the calculated luminosity is included at the position of each pixel inside each of the polygons;

a generator that generates a color of each pixel in accordance with the representative luminosity assigned to the determined luminosity level and a predetermined color of each of the polygons; and a plotter that plots each pixel inside each of the polygons in the generated color.

18. A game device that renders a three-dimensional model disposed in a virtual space and comprising a plurality of polygons, the game device comprising:

a computer, a reader that reads a program, from a computer readable recording medium on which the program to be executed by said computer is recorded, a divider that divides a luminosity into a plurality of luminosity levels of various ranges;

an associator that associates each of the luminosity levels with a reference luminosity;

a selector that selects, with the luminosity being divided into levelsin accordance with said program, luminosity levels individually from a plurality of luminosity levels, each level being associated in advance with a reference luminosity, and a plotter that calculates, each time a luminosity level is selected by said selector and in accordance with said program, luminosity at a position of each pixel inside said polygons in accordance with a luminosity predetermined for each of apexes of said polygons, and that plots, only when a luminosity at the position of each pixel lies within a range of luminosity corresponding to said selected luminosity level, the pixel with a color in accordance with the reference luminosity corresponding to said selected luminosity level and a color predetermined for said polygons.

* * * * *